(12) United States Patent
Maxik et al.

(10) Patent No.: US 9,959,699 B2
(45) Date of Patent: *May 1, 2018

(54) METHOD FOR ASSEMBLING A LUMINAIRE WITHIN AN AUTONOMOUS LUMINAIRE ASSEMBLY AND VENDING SYSTEM

(71) Applicant: Lighting Science Group Corporation, Melbourne, FL (US)

(72) Inventors: Fredric S. Maxik, Cocoa Beach, FL (US); Robert R. Soler, San Marcos, CA (US); David E. Bartine, Cocoa, FL (US); Valerie A. Bastien, Melbourne, FL (US); Matthew Regan, Melbourne, FL (US); James Lynn Schellack, Skiatook, OK (US); Theodore Scone, Satellite Beach, FL (US)

(*) Notice: Subject to any disclaimer, the term of this patent is extended or adjusted under 35 U.S.C. 154(b) by 0 days. days.

This patent is subject to a terminal disclaimer.

(21) Appl. No.: 14/996,714

(22) Filed: Jan. 15, 2016

(65) Prior Publication Data
US 2016/0125684 A1 May 5, 2016

Related U.S. Application Data

(63) Continuation of application No. 14/257,489, filed on Apr. 21, 2014, now Pat. No. 9,269,211.
(Continued)

(51) Int. Cl.
*G01R 31/28* (2006.01)
*G07F 11/70* (2006.01)
(Continued)

(52) U.S. Cl.
CPC .............. *G07F 11/70* (2013.01); *B23P 21/00* (2013.01); *F21V 19/0015* (2013.01);
(Continued)

(58) Field of Classification Search
CPC . F21K 9/50; F21V 13/02; F21V 15/01; F21V 15/012; F21V 17/00; F21V 17/04;
(Continued)

(56) References Cited

U.S. PATENT DOCUMENTS 8,272,762 B2 * 9/2012 Maxik ...................... F21K 9/90
362/249.02
9,127,818 B2 * 9/2015 Maxik ..................... F21K 9/175
(Continued)

*Primary Examiner* — Paul D Kim
(74) *Attorney, Agent, or Firm* — Mark Malek; Daniel C. Pierron; Widerman Malek, PL

(57) ABSTRACT

A system for assembling a luminaire comprising a housing, a computer-controlled manipulation device, and a parts repository defined within the housing and configured to carry a plurality of light modules, a plurality of luminaire housings of various luminaire housing types, and a plurality of optics of various optic types. The system further comprises a programming device configured to program a light module of the plurality of light modules to emit light having lighting characteristics. Each of the light modules are configured to be removably couplable to the computer-controlled manipulation device. The luminaire housings each comprise a locking tab configured to permit the respective light modules to engage therewith, thereby enabling attachment of the respective light modules to the respective luminaire housings. Each of the optics comprise a locking tab configured to permit a respective luminaire housing to engage therewith, enabling attachment of the respective luminaire housing to the respective optic.

17 Claims, 17 Drawing Sheets

Related U.S. Application Data

(60) Provisional application No. 61/815,018, filed on Apr. 23, 2013.

(51) Int. Cl.
*G07F 17/02* (2006.01)
*B23P 21/00* (2006.01)
*F21V 19/00* (2006.01)
*F21Y 115/10* (2016.01)

(52) U.S. Cl.
CPC ........... *G07F 17/02* (2013.01); *F21Y 2115/10* (2016.08); *Y10T 29/49002* (2015.01); *Y10T 29/53265* (2015.01)

(58) Field of Classification Search
CPC ............. F21V 17/164; Y10T 29/49004; Y10T 29/49002; Y10T 29/49826; Y10T 29/49895; Y10T 29/49815; Y10T 29/53091; Y10T 29/5313; Y10T 29/53187; Y10T 29/53265; Y10T 29/53274
USPC ................................ 29/592.1, 721, 729, 762
See application file for complete search history.

(56) References Cited

U.S. PATENT DOCUMENTS

| | | | |
|---|---|---|---|
| 9,269,211 B2 | 2/2016 | Maxik et al. | |
| 2010/0249996 A1 | 9/2010 | Tsao et al. | |
| 2011/0273889 A1* | 11/2011 | Boomgaarden | F21S 8/061 362/294 |
| 2013/0107518 A1* | 5/2013 | Boyer | F21V 29/004 362/235 |
| 2013/0335965 A1* | 12/2013 | Stefanoff | F21V 17/00 362/235 |
| 2014/0104845 A1* | 4/2014 | Boomgaarden | B23P 15/26 362/293 |
| 2014/0177228 A1* | 6/2014 | Ellingson | F21V 29/004 362/294 |

* cited by examiner

METHOD FOR ASSEMBLING A LUMINAIRE WITHIN AN AUTONOMOUS LUMINAIRE ASSEMBLY AND VENDING SYSTEM

RELATED APPLICATIONS

This application is a continuation and claims the benefit under 35 U.S.C. § 120 of U.S. patent application Ser. No. 14/257,489 titled Autonomous Luminaire Assembly and Vending System and Associated Methods filed Apr. 21, 2014, now U.S. Pat. No. 9,269,211 which in turn claims the benefit under 35 U.S.C. § 119(e) of U.S.C. Provisional Patent Application Ser. No. 61/815,018 titled Autonomous Luminaire Assembly and Vending System and Associated Methods filed Apr. 23, 2013, the content of each of which is incorporated by reference herein in their entireties, except to the extent disclosures therein are inconsistent with disclosure made herein.

FIELD OF THE INVENTION

The present invention relates to systems and methods for an automated luminaire manufacturing and vending system.

BACKGROUND OF THE INVENTION

The current methods of managing an inventory of lighting devices in retail stores requires the dedication of significant amounts of shelf space to accommodate the wide variety of lighting devices. Lighting devices may vary according to form factor, brightness, color, color temperature, and by other characteristics. Where the lighting devices come pre-assembled and packaged, the opportunity to reduce shelf space occupied thereby is minimal.

Advances in lighting using semiconducting materials, such as light-emitting diodes (LEDs), has enabled greater flexibility to vary the characteristics of light emitted by a single lighting device. By including an array of LEDs which are operable to emit light with differing characteristics, coupled with electronic systems that are configurable to selectively operate the LEDs so as to cause the lighting device to emit light with varying characteristics, there is an opportunity to reduce the shelf/floor space occupied by lighting devices by providing a system that is able to provide multiple types of lighting devices with varying characteristics by assembling and/or configuring lighting devices on an as-needed basis responsive to immediate requests from consumers for lighting devices of certain types and having certain characteristics. Such a system may have one or a few types of lighting modules that may be implemented in a variety of form factors and may be configured to emit light responsive to characteristics indicated by a consumer.

U.S. Patent Application Publication No. 2010/0249996 to Tsao et al (hereinafter "Tsao") discloses an automatic vending machine for light bulbs including a component depository, an assembling system, and a user interface. Tsao broadly discloses the concept of selecting components and assembling a light bulb based upon an input from a user. However, Tsao does not disclose solutions to a number of problems faced by such a system, such as methods for maintaining and accessing components from the depository, limitations in automated assembly systems and implementations in such autonomous applications, nor any system for confirming an assembled light bulb conforms to the input received from the user. Accordingly, there is a need in the art for a system that overcomes such difficulties in the autonomous assembly and vending of lighting devices.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a method for assembling a luminaire within an autonomous luminaire assembly and vending system. The method may comprise the steps of receiving luminaire specifications from a user input device defined as received specifications, removably coupling a light module with a computer-controlled manipulation device, and programming the light module to emit light having characteristics responsive to the received specifications. The method may further comprise the steps of retrieving a luminaire housing from a plurality of luminaire housing types responsive to the received specifications, attaching the light module to the luminaire housing by operation of the computer-controlled manipulation device, retrieving an optic from a plurality of optic types responsive to the received specifications, attaching the luminaire housing to the optic by operation of the computer-controlled manipulation device, and decoupling the light module and the computer-controlled manipulation device.

Additionally, the step of attaching the light module to the luminaire housing may comprise operating the computer-controlled manipulation device to position the light module so as to engage the luminaire housing. Furthermore, the step of attaching the light module to the luminaire housing may comprise inserting the light module into lock tabs associated with the luminaire housing. Moreover, the step of attaching the luminaire housing to the optic may comprise operating the computer-controlled manipulation device to position the luminaire housing so as to engage with the optic. Additionally, the step of attaching the luminaire housing to the optic may comprise inserting the luminaire housing into lock tabs associated with the optic.

In some embodiments, the step of retrieving a luminaire housing from a plurality of luminaire housing types may comprise accessing a carrier of luminaire housing types from a luminaire housing repository comprising a plurality of carriers, removing a luminaire housing from the carrier of luminaire housings, and replacing the carrier of luminaire housings in the luminaire housing repository. Additionally, the step of removing a luminaire housing from the carrier of luminaire housings may be performed by attaching the light module to the luminaire housing.

The step of retrieving an optic from a plurality of optic types may comprise accessing a carrier of optics from an optic repository comprising a plurality of carriers, removing an optic from the carrier of optics, and replacing the carrier of optics in the optic repository. Furthermore, the step of removing an optic from the carrier of optics may be performed by attaching the luminaire housing to the optic.

In some embodiments, the light module may be programmed using at least one of radio communication, visible light communication, and acoustic communication. Furthermore, the method may further comprise performing lighting validation to confirm that at least one lighting characteristic of brightness, color, color temperature, color rendering index (CRI), and distribution of the luminaire complies with the received specifications. In some embodiments, if the lighting validation indicates that if at least one of brightness, color, color temperature, CRI, and distribution of the luminaire does not comply with the received specifications, the method may further comprise the step of applying a correction factor to the light module such that a non-conforming lighting characteristic is corrected to comply with the received specifications.

In some embodiments, the method may further comprise the steps of accessing a parts database including information related to a quantity of each type of luminaire housing, each type of optic, and light modules, recording a deduction of the light module, the luminaire housing, and the optic to the parts database, determining if any of the quantities of each type of luminaire housing, each type of optic, and light modules is equal to or less than a threshold quantity associated therewith, and upon a determination that the quantity is equal to or less than the threshold quantity, generating an alert indicating the determination. Furthermore, the step of generating the alert may comprise transmitting a message across a network.

In some embodiments, the step of coupling the light module to the computer-controlled manipulation device may comprise accessing a carrier of light modules from a light module repository comprising a plurality of carriers, removing a light module from the carrier of light modules, and replacing the carrier of light modules in the light module repository. Furthermore, removing the light module from the carrier of light modules may be performed by removably coupling the light module from the computer-controlled manipulation device. Additionally, the step of removably coupling the light module to the computer-controlled manipulation device may comprise gripping the light module with a gripping mechanism of the computer-controlled manipulation device.

Additionally, embodiments of the present invention are related to a system for assembling a luminaire comprising a housing, a computer-controlled manipulation device, and a parts repository defined within the housing. The parts repository may be configured to carry a plurality of light modules, a plurality of luminaire housings of various luminaire housing types, and a plurality of optics of various optic types. Furthermore, the system may further comprise a programming device configured to program a light module of the plurality of light modules to emit light having lighting characteristics;

Each of the light modules may be configured to be removably couplable to the computer-controlled manipulation device. Additionally, the housings each comprise a locking tab configured to permit the respective light modules to engage therewith, thereby enabling attachment of the respective light modules to the respective luminaire housings. Furthermore, each of the optics may comprise a locking tab configured to permit a respective luminaire housing to engage therewith, thereby enabling attachment of the respective luminaire housing to the respective optic.

In some embodiments, the system may further comprise a power source configured to provide electrical power to the light engine positioned in operational communication therewith, as well as an optical sensor that may be to measure characteristics of light emitted by an assembled luminaire positioned in electrical communication with the programming device. The programming device may be configured to control the operation of the power source to control the emission of light by the light module. Furthermore, the optical sensor may be configured to provide information related to characteristics of light emitted by the assembled luminaire. Additionally, the programming device may be configured to analyze the information related to the characteristics of light provided by the optical sensor. The programming device may be configured to apply a correction factor to the respective light module responsive to the analysis of the information related to the characteristics of light. The programming device may comprise at least one of a radio communication device, a visible light communication device, and an acoustic communication device.

In some embodiments, the system may further comprise a first carrier configured to carry at least a portion of each of the plurality of light modules, a second carrier configured to carry at least a portion of each of the plurality of luminaire housings, and a third carrier configured to carry at least a portion of each of the plurality of optics. Each of the first, second, and third carriers may be configured to be positionable within and carried by the parts repository.

In some embodiments, the system may further comprise a network interface device. The network interface device may be configured to communicate with a remote computerized device across a network and receive luminaire configuration information therefrom. The programming device may receive the luminaire configuration from the network interface device and assemble a luminaire responsive to the luminaire configuration.

Additionally, embodiments of the present invention are related to a system for assembling a luminaire comprising a housing, a computer-controlled manipulation device, and a parts repository defined within the housing and configured to carry a plurality of light modules, a plurality of luminaire housings of various luminaire housing types, and a plurality of optics of various optic types. Furthermore, the system may further comprise a first carrier that may be configured to carry at least a portion of each of the plurality of light modules, a second carrier that may be configured to carry at least a portion of each of the plurality of luminaire housings, and a third carrier that may be configured to carry at least a portion of each of the plurality of optics. The system may further comprise a programming device that may be configured to program the light module to emit light having lighting characteristics, a power source that may be configured to provide electrical power to the light module positioned in operational communication therewith, an optical sensor that may be configured to measure characteristics of light emitted by an assembled luminaire positioned in electrical communication with the programming device, and a user interface carried by the housing and positioned in communication with the programming device.

Each of the plurality of light modules may be configured to be removably couplable with the computer-controlled manipulation device. Furthermore, each of the plurality of luminaire housings may each comprise a locking tab configured to permit a respective light module to engage therewith, thereby enabling attachment of the respective light module to a respective one of the plurality of luminaire housings. Additionally, each of the plurality of optics may comprise a locking tab configured to permit a respective luminaire housing to engage therewith, thereby enabling attachment of the respective luminaire housing to a respective one of the plurality of optics. Each of the first, second, and third carriers may be configured to be positionable within the parts repository. Furthermore, the user interface may be configured to receive input form a user.

The programming device may be configured to control the operation of the power source to control the emission of light by the light module. Additionally, the optical sensor may be configured to provide information related to characteristics of light emitted by an assembled luminaire. The programming device may be configured to analyze the information related to the characteristics of light provided by the optical sensor and to apply a correction factor to each of the respective light modules responsive to the analysis of the information related to the characteristics of light.

BRIEF DESCRIPTION OF THE DRAWINGS

FIG. 4b is a side sectional view of a central member of the luminaire of FIG. 4a taken through line 4b-4b in FIG. 4a.

FIG. 8b is a side elevation view of a step in the assembly process subsequent to the step depicted in FIG. 8a.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Additionally, in this detailed description of the present invention, and autonomous assembling and vending system may be referred to in various ways including, but not limited to, and assembly system, a manufacturing system; a luminaire assembly system, a luminaire manufacturing system, a vending system, a luminaire vending system, and the like. The inclusion or omission of any of the phrases assembly, manufacturing, and vending does not alter the scope of the invention, which contemplates a system capable of both assembling and vending luminaires, as described hereinbelow.

An embodiment of the invention, as shown and described by the various figures and accompanying text, provides a system for assembling and vending luminaires. More specifically, a system for autonomously assembling luminaires of a variety of configurations and having varying lighting characteristics, both of which are selectable by a user, is presented. Furthermore, a method of vending luminaires including local and remote ordering, as well as the manufacture and packaging of the ordered luminaires, is presented. Additionally, a method of facilitating user selection of lighting characteristics to be incorporated into the manufacture of luminaires is presented.

Figure 1:
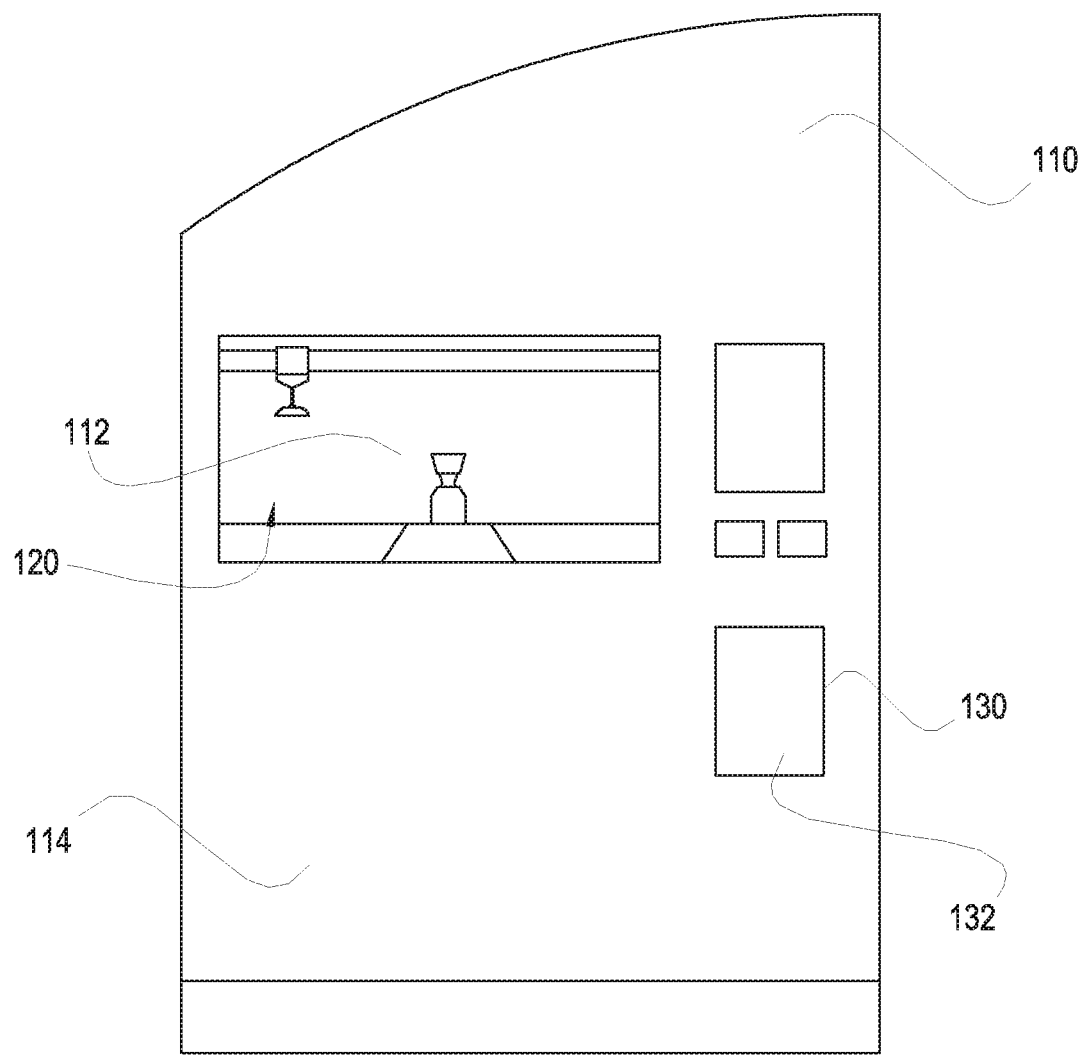
FIG. 1 is a side elevation view of an autonomous luminaire assembly and vending system according to an embodiment of the present invention.

Referring now to FIG. 1, an embodiment of the invention is presented. The embodiment includes a vending system 100 including a housing 110. The housing 110 may be configured to conform to standard geometries for vending apparatuses. Moreover, the housing 110 may be configured to be positioned within a retail facility, conforming to geometries necessary to permit the vending system 100 to pass through a standard door frame. Additionally, the vending system 100 may include an electrical connector (not shown) configured to electrically connect to an external power source. In some embodiments, the electrical connector may be configured to connect to a standard electrical outlet. Moreover, the vending system 100 may include one or more power circuits (not shown) configured to condition electricity received from an external power source through the electrical connector to provide electricity to the various electrical components of the vending system 100. The power circuits may be configured to receive electricity that is either AC or DC, and within a voltage range of from about −280 volts to about 280 volts. Where the electricity is AC, the power circuit may be configured to receive electricity from within the range from about 15 Hz to about 280 Hz.

The vending system 100 may further comprise an assembly chamber 120 defined within the housing 110. The assembly chamber 120 may be configured to permit various elements of the vending system 100 used in the manufacture of luminaires, as well as the storage of the constituent elements prior to manufacture. In some embodiments, the housing 110 may include a window 112 that partially defines the assembly chamber 120. The window 112 may be positioned on a front face 114 of the housing 110. Furthermore, the window 112 may be generally transparent or translucent so as to permit an observer to witness the manufacture of an ordered luminaire. In some embodiments, the window 112 may be tinted, filtered, polarized, or otherwise configured to alter the transmission of light therethrough so as to prevent light they may be harmful to an observer from passing therethrough.

The vending system 100 according to embodiments of the present invention may further include a dispensing section 130. The dispensing section 130 may include a door 132 and a dispensing chamber (not shown). Once an assembled luminaire is manufactured in the assembly chamber 120, it may be transitioned to the dispensing section 130, more specifically, the dispensing chamber, for retrieval. The door 132 may be configured to prevent an assembled luminaire from falling out of the dispensing chamber and onto the ground, potentially damaging the assembled luminaire.

The vending system 100 according to embodiments of the present invention may further include a payment system 300 configured to receive payment prior to at least one of the manufacture of a luminaire and assembly of the luminaire. Those skilled in the art will appreciate that the vending system 100 according to an embodiment of the present invention also contemplates that payment may be received after the manufacture and assembly of the luminaire. This is contemplated, for example, for systems that may provide a certain guarantee as to satisfaction, or for return customers. The payment system 300 may be any device configured to transact money in any fashion, including, but not limited to, a credit/debit card reading device, a bill receiving device, and a coin receiving device. Furthermore, the payment system 300 may be positioned on the front face 114 of the housing 110 to permit ready access by a person seeking to make payment. Additionally, the payment system 300 may be configured to confirm the identity of a person seeking to collect previously-ordered and paid-for luminaires. The identity of the person seeking to collect the luminaires may be determined by reading at least one of a credit card, and debit card, a driver's license, or any other machine-readable information-containing artifact, the information of which may confirm or disconfirm the identity of a person. Furthermore, in some embodiments, the payment system 300 may be configured to transfer an order from the vending system 100 to an external payment system, such as a register, within the retail location that the vending system 100 is positioned within.

The vending system 100 may further include a user interface 400. The user interface 400 may be positioned on the front face 114 of the housing 110 so as to permit ready access by a person seeking to use the vending system 100. The user interface 400 may be configured to permit a person to interact with the vending system 100, including to facilitate ordering and initiating assembly of a luminaire, to collect a previously-ordered luminaire, to learn more about lighting and the luminaires available for purchase through the vending system 100, and any other interaction between the person and the vending system 100.

Figure 2A:
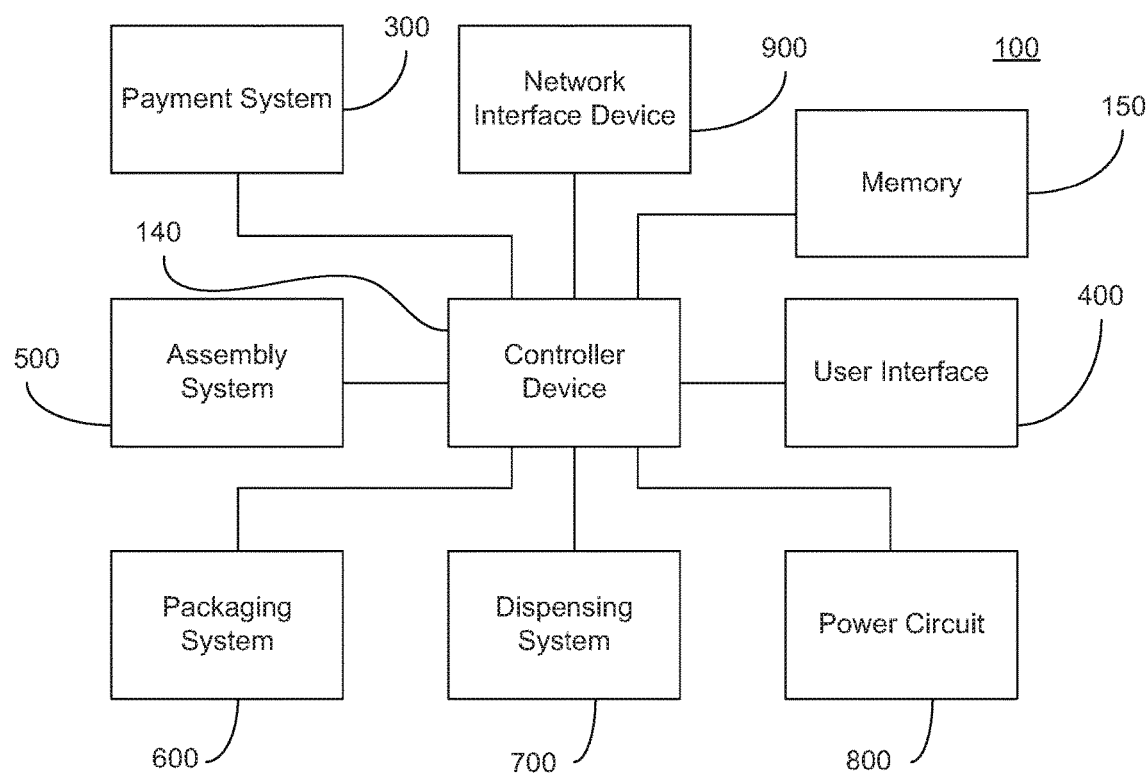
FIG. 2a is a schematic representation of an autonomous luminaire assembly and vending system according to an embodiment of the present invention.

Referring now to FIG. 2a, a schematic representation of the autonomous assembling and vending system 100 according to embodiments of the present invention is presented. The vending system 100 may include a controller device 140. The controller device 140 may be any electronic device capable of facilitating communication between and/or controlling the operation of the various electrical components of the vending system 100. As such, the controller device 140 may be placed in electrical communication with the various electrical components of the vending system 100. For example, the controller device 140 may be positioned in electrical communication with the payment system 300, the user interface 400, an assembly system 500, a packaging system 600, a dispensing system 700, a power circuit 800 (which may be one or more power circuits as described hereinabove), and a network interface device 900. The controller device 140 may be connected with any or all of the abovementioned electrical components of the vending system 100 to control the operation thereof.

Figure 2B:
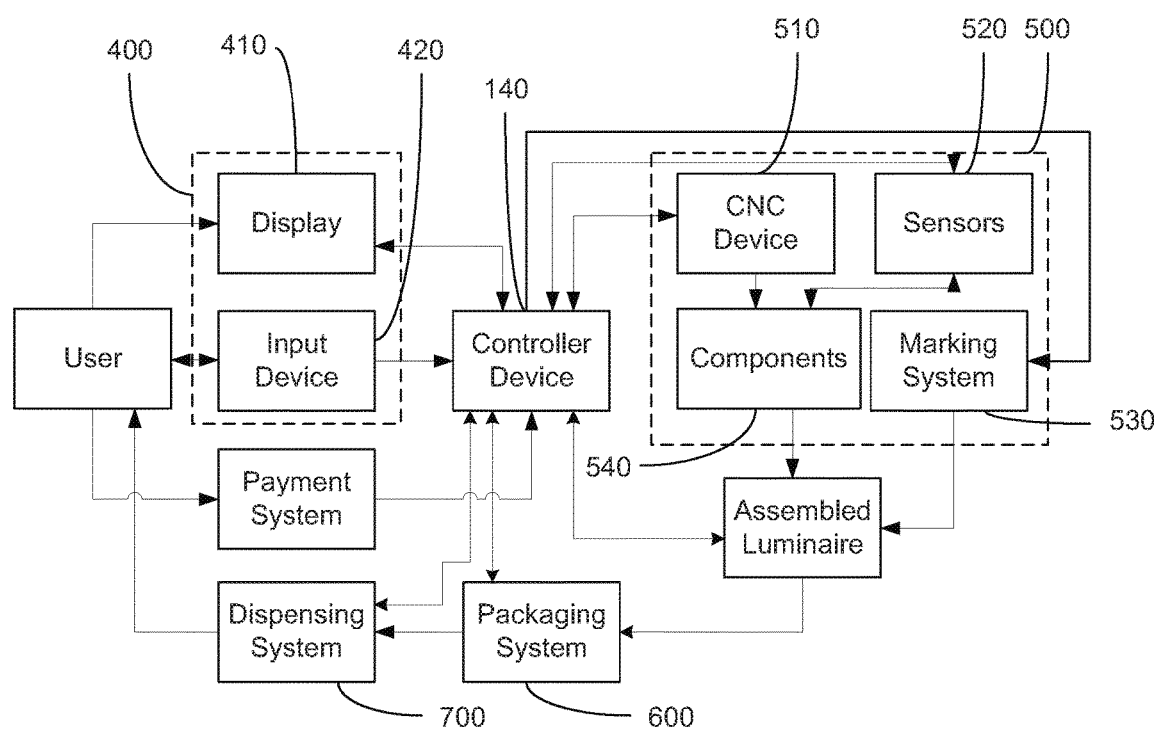
FIG. 2b is a schematic representation of an assembly system, controller device, and user interface of the autonomous luminaire assembly and vending system of FIG. 2a FIG. 3 is a side elevation view of a user interface of the autonomous luminaire assembly and vending system of FIG. 1.

Referring now to FIG. 2b, additional aspects of the vending system 100 as depicted in FIG. 2a will now be discussed. The user interface 400 may include a display 410 and an input device 420. Each of the display 410 and the input device 420 may be positioned in electrical communication with the controller device 140. In some embodiments, where the display 410 is configured to receive inputs from a user, such as a touchscreen device, the display 410 and the input device 420 may be a single integral component of the vending system 100.

Additionally, details regarding the assembly system 500 are provided. Any method of assembling a luminaire, which will be discussed in greater detail below, is contemplated and intended to be included within the scope of the invention. In the present embodiment demonstrated in FIG. 2b, the assembly system 500 may include a computer numerical control (CNC) device 510, sensors 520, a marking system 530, and a repository of components 540. Each of the CNC device 510, the sensors 520, and the marking system 530 may be positioned in electrical communication with the controller device 140 such that the controller device 140 is able to initiate, monitor, and ensure successful completion of a luminaire. More specifically, the controller device 140 is configured to provide instructions to the CNC device 510 causing the CNC device 510 to retrieve components from the components repository 540 and assemble them into a luminaire. While a CNC device 510 is disclosed, any type of computer-controlled manipulation device, as may be known in the art, is contemplated and included within the scope of the invention.

Additionally, the sensors 520 may provide information to the controller device 140 regarding the status of the assembly system 500, including, but not limited to, the status of the CNC device 510, the status of the environment within which the CNC device 510 is operating within, the status of the marking system 530, and the status of the components repository 540, including current inventory levels and whether an obstruction occlusion exists.

Once the CNC device 510 has completed its assembly process, the marking system 530 may provide or create visible markings on the assembled luminaire by any means or method as is known in the art, including, but not limited to, etching, such as laser etching, attaching of the label, ink-based printing, and the like. The assembled luminaire may then be packaged by the packaging system 600 and delivered to the user by the dispensing system 700, each of which may be controlled by the controller device 140.

Figure 3:
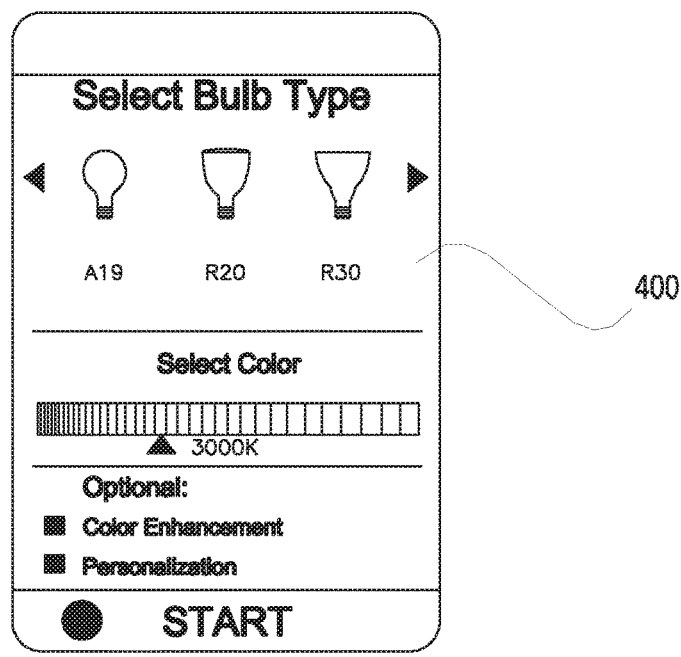

Referring now to FIG. 3, the user interface 400 will now be discussed in greater detail. The user interface 400 may be adapted to receive inputs from a user. The inputs received via the user interface 400 may be transmitted to the controller device 140. The user interface 400 may be adapted to receive inputs relating to the configuration of a luminaire to be assembled by the vending system 100. For example, the user interface 400 may be configured to receive inputs that may control the luminous intensity, beam angle, color, color temperature, color rendering index, and dimming of a luminaire to be manufactured by the vending system 100. Additionally, the user interface 400 may be configured to receive input regarding various other aspects of a luminaire to be manufacture by the vending system 100, including, but not limited to, form factor, ability for the luminaire to be reprogrammed, including an additional electronic device such as a photodetector, an occupancy detector, a motion sensor, heuristic learning, machine learning, data collection software, a time keeping device, and a networking interface device, including a radio for wireless communication according to a wireless communication standard, such as Wi-Fi, Bluetooth, or Zigbee. Types of form factors that may be included are forms factors for light bulbs, including, but not limited to, A series bulbs, B series bulbs, C series bulbs, CA series bulbs, S series bulbs, F series bulbs, RP, MB, and BT series bulbs. R series bulbs, MR series bulbs, PS series bulbs, AR series bulbs, ALR series bulbs, BR series bulbs, PAR series bulbs, T series bulbs, G series bulbs, BT series bulbs, E series bulbs, and ED series bulbs. More specifically, in some embodiments, the form factors of A15, A19, G25, PAR20, PAR30, PAR38, BR20, BR30, and BR40 may all be manufacturable by the vending system 100.

The user interface 400 may be configured to receive inputs from a user in any suitable mode. For example, as shown in FIG. 3, the user interface 400 may include a touchscreen device 410. The touchscreen device 410 may be configured to present information to the user as well as options to select certain characteristics or functionality to be included in a luminaire assembled by the vending system 100. While a touchscreen device 410 is shown, any device capable of conveying information to the user and receiving an input from the user is contemplated and within the scope of the invention, including, but not limited to, a display device paired with at least one of a keyboard and a mouse. Additionally, in some embodiments, the vending system 100, or, more specifically, the user interface 400, may include a device capable of communicating with a user electronic device, such as a smartphone, to receive the same or similar characteristics and functionality for a luminaire to be assembled by the vending system 100. Therefore, it is contemplated and within the scope of the invention that the vending system 100 may include software that may be downloadable and/or executable on a user electronic device, such as a smartphone, tablet, personal computer, notebook computer, and the like. For example, the software may be an app adapted to function on at least one of the Android®, iOS®, or Windows RT® mobile operating systems, as well as at least one of the Windows® and Mac OS X® operating systems.

Furthermore, in some embodiments, the software may be a website that is visitable by a user using an internet-connected device. The website may enable a user to select the characteristics and functionality to be included in a luminaire, as well as indicate a particular vending system 100 at which the luminaire will be manufactured. In such embodiments, the vending system 100 may include a network interface device 900 that is in communication, either directly or indirectly, with the aforementioned website across a network, such as, for example, the Internet. Generally, the website will be housed on a server and maintain a database of order information that may be sent to a vending system 100 of the present embodiment across a network, such as the Internet. Accordingly, the vending system 100 will be adapted to receive a luminaire order via the network interface device and, upon indication of payment or that payment will be made at the time of pick-up by the user, may commence manufacturing the luminaire as described hereinbelow. Upon completion of the manufacturing of the luminaire, the vending system 100 may temporarily store the manufactured luminaire until the ordering user arrives at the vending system 100, provides an indication of his or her identity as described hereinabove, and at that time may receive delivery of the luminaire. In some other embodiments, the network interface device 900 may be in communication with the user device, directly or indirectly, across other types of networks, including a Local Access Network (LAN), a Wide Area Network (WAN), and the like.

Furthermore, in some embodiments, the user interface 400 may be configured to receive an image of an environment. The user interface 400 may be configured to receive the image from a user computerized device by any method described hereinabove, as well as other methods of communication, including IR communication and wired communication, such as universal serial bus (USB) protocol. The environment may be the environment within which a luminaire assembled by the vending system 100 will operate within. Upon receiving an image, the controller device 140 may be configured to analyze the image of the environment so as to simulate how the environment will appear to a person observing the environment when lit by a luminaire according to the lighting characteristics indicated by the user and displayed on the user interface 400. For example, the user may provide an image of their bedroom to the user interface 400. The controller device 140 may then analyze the picture and simulate what the room will look like by a luminaire that emits light having 1,000 lumens of brightness, a color temperature of 3000 K, and a CRI of 70. Any variance of any characteristics of lighting mentioned hereinabove may be simulated and displayed on the user interface 400. In this way, a user may be able to better determine what lighting characteristics they desire for the environment.

The vending system 100 may further comprise a memory 150. The memory 150 may be in electrical communication with the controller device 140. In some embodiments, the controller device 140 may be configured to maintain a file system on the memory 150 of record data, the record data including a record of each luminaire assembled by the vending system 100. Furthermore, in some embodiments, the controller device 140 may be configured to analyze the record data to identify any purchasing trends, such as whether a particular form factor, brightness, color temperature, beam angle, or any other aspect or feature of a luminaire that the vending system 100 may include in a luminaire, is being more or less frequently included or omitted from assembled luminaires. Furthermore, in some embodiments, the controller device 140 may be configured to transmit at least one of the record data and identified trends via the network interface device 900 to a remote computerized device, such as a server, that may collect sales information from a network of vending systems identical or similar to the vending system 100. Furthermore, in some embodiments, the vending system 100 may include geographical awareness such that the location of the vending system 100 may be included in the record data. Geographical awareness may be accomplished by any method known in the art, including, but not limited to, determining location via an internet protocol (IP) address assigned to the network interface device 900, location according to cellular network location, and, where the vending system 100 includes a global positioning system GPS) device, determination of location through use of the GPS device. As such, trends may be identified regionally according to geographic location, as well as by time.

The luminaires manufactured by the vending system 100 will now be discussed in greater detail. In some embodiments, the vending system 100 may include components necessary to manufacture luminaires in any of the form factors mentioned hereinabove. In some other embodiments, the vending system 100 may include the components necessary to manufacture a subset of the aforementioned form factors.

Figure 4A:
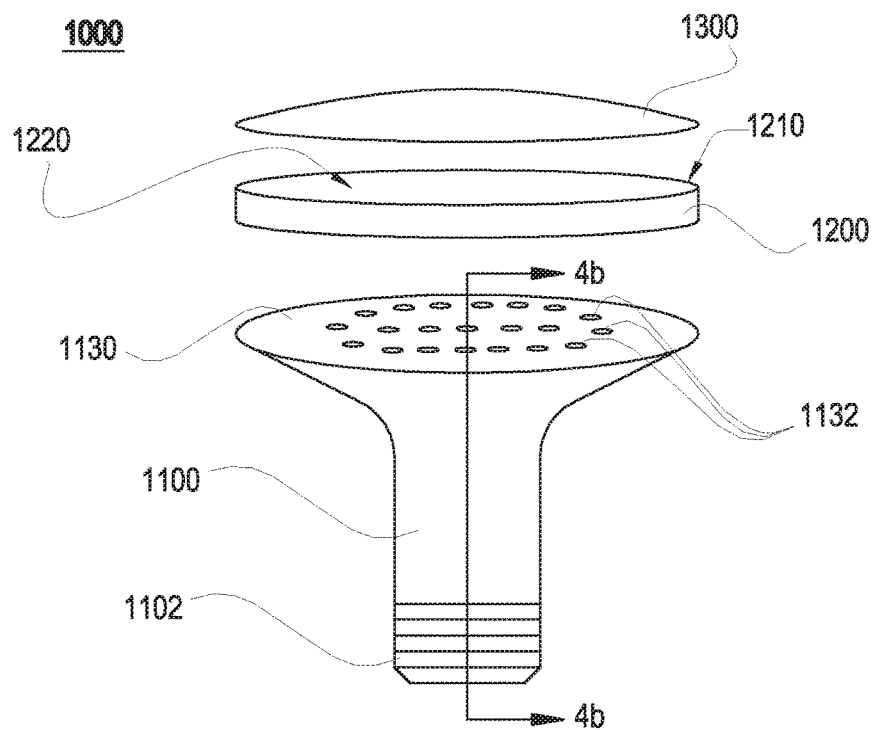
FIG. 4a is a perspective exploded view of a luminaire producible by an autonomous luminaire assembly and vending machine according to an embodiment of the present invention.
Figure 4B:
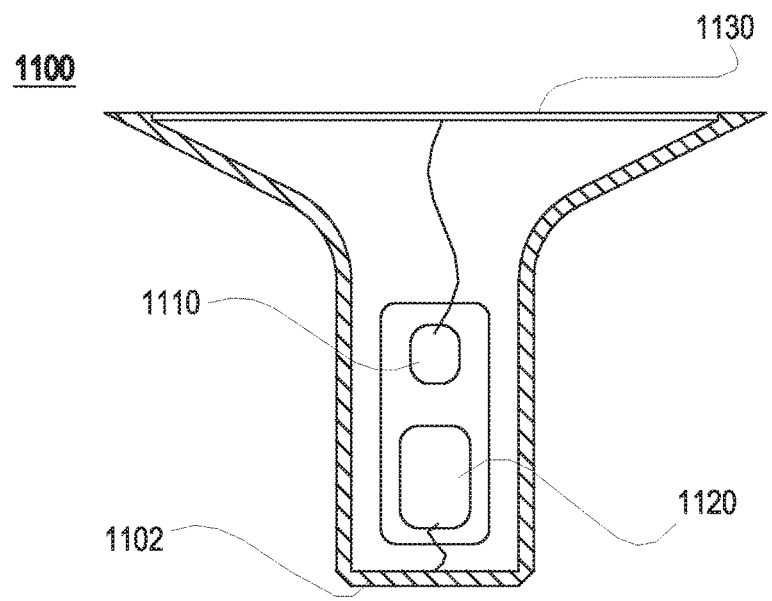

Referring now to FIGS. 4a-b, an example of a luminaire 1000 manufactured by the vending system 100 is presented. Each luminaire 1000 manufactured by the vending system 100 may comprise a central member 1100, a body member 1200, and an optic 1300. Each of the central member 1100, the body member 1200, and the optic 1300 may be configured so as to facilitate manufacture and assembly by the assembly system 500. More specifically, the central member 1100 may be configured to be attached to at least one of the body member 1200 and the optic 1300. Additionally, in some embodiments, the body member 1200 may be configured to attach to the optic 1300. Furthermore, in some embodiments, the body member 1200 may include a reflector member 1210. The reflector member 1210 may be configured to reflect light incident thereupon in the direction of the optic 1300 when the luminaire 1000 is in an assembled state. Furthermore, the body member 1200 may further comprise an internal chamber 1220 configured to permit the positioning of the central member 1100 at least partially therein, and in some embodiments, facilitating the attachment of the central member 1100 to the body member 1200.

Each of the central member 1100, the body member 1200, and the optic 1300 may be configured so as to facilitate storage within the vending system 100. More specifically, they may be configured so as to at least one of minimize volume, facilitate stacking, and facilitate nesting within like elements. For example, the body member 1200 may be configured such that a first body member 1200 may be at least partially disposed within a second body member 1200. Similarly, a first optic 1300 may be configured to be at least partially disposed within a second optic 1300. Furthermore, the central member 1100 may be configured such that a first central member 1100 may be positioned on top of a second central member 1100 in a stacked arrangement while occupying as little volume as possible. Additionally, the central member 1100 may be configured so as to discourage or prevent the movement of the central member 1100 as well as an adjacent central member 1100 or any other element of the luminaire 1000. Moreover, varying configurations of each of the central member 1100, the body member 1200, and the optic 1300 may be configured so as to cooperate with other embodiments of the same or different elements of the luminaire 1000 so as to require the least amount of volume when stored within the housing 110 of the vending system 100 prior to assembly.

Each of the central member 1100, body member 1200, and optic 1300 may be attached to at least one of each other by the assembly system 500 according to any method known in the art, including, but not limited to, fasteners, interference fits, glues, adhesives, screw fits, and welding, including laser welding and ultrasonic welding. This list is exemplary only, and other means and methods of attachment are contemplated and included within the scope of the invention.

As described hereinabove, the vending system 100 may be configured to manufacture and assemble luminaires to conform to a variety of standard bulb sizes and configurations. Accordingly, the vending system 100 may include a variety of configurations of each of the body member 1200 and the optic 1300, wherein the various configurations thereof are adapted to conform to the various standard bulb configurations listed hereinabove. In some embodiments, the central member 1100 may be provided in a single configuration adapted to cooperate with the various configurations of the body member 1200 and the optic 1300. In other embodiments, a first configuration of the central member 1100 may be configured to cooperate with a first set of configurations of the body member 1200 and the optic 1300, and a second configuration of the central member 1100 may be configured to cooperate with a second set of configurations of the body member 1200 and the optic 1300. Any number of configurations of the central member 1100, body member 1200, and optic 1300, and combinations thereof, are contemplated and included within the scope of the invention.

Referring now specifically to to FIG. 4b, the central member 1100 will now be discussed in detail. In some embodiments, the central member 1100 may comprise an electrical base 1102, a programmable driver 1110, a power circuit 1120, and a light engine 1130. The electrical base 1102 may be configured to electrically couple with any type of lighting fixture socket, including, but not limited to, Edison screw bases, and bayonet, bi-post, bi-pin and wedge bases. Furthermore, the electrical base 1102 may be configured to conduct electricity from a lighting fixture socket to any device in electrical communication therewith. For example, in come embodiments, the power circuit 1120 may be positioned in electrical communication with the electrical base 1102. The power circuit 1120 may be configured to receive electricity that is either AC or DC, and within a voltage range of from about −280 volts to about 280 volts. Where the electricity is AC, the power circuit 1120 may be configured to receive electricity from within the range from about 15 Hz to about 280 Hz. The power circuit 1120 may be configured to provide electricity at the voltage and of the current type needed by the various electrical component of the central member 1100 that is positioned in electrical communication, either directly or indirectly, with the power circuit 1120, including the programmable driver 1110 and the light engine 1130.

The programmable driver 1110 will now be discussed in greater detail. The programmable driver 1110 may be positioned in electrical communication with the light engine 1130 and be configured to control the operation thereof. More specifically, the programmable driver 1110 may be configured to operate the light engine 1130 so as to emit light including the characteristics of light and additional functionality indicated by a user selection as described hereinabove. Referring now additionally to FIG. 4, in some embodiments, where the light engine 1130 comprises a plurality of light-emitting diodes (LEDs) 1132, the programmable driver 1110 may be positioned in electrical communication with the light engine 1130 so as to individually control and operate each LED of the plurality of LEDs 1132. Such individual control of the plurality of LEDs 1132 may enable the programmable driver 1110 to cause the light engine 1130 to emit light having the characteristics of light indicated by the user selection. More detail regarding the operation of the programmable driver 1110 and the light engine 1130 may be found in U.S. patent application Ser. No. 13/737,606 titled "Tunable Light System and Associated Methods" filed Jan. 9, 2013, the content of which is incorporated herein in its entirety. As stated hereinabove, the programmable driver 1110 may be configured to operate the plurality of LEDs 1132 so as to produce light having the characteristics of light indicated by a user selection, including, but not limited to, luminous intensity, beam angle, color, color temperature, color rendering index, and dimming. For example, the programmable driver 1110 may be configured to operate the light engine 1130 so as to emit light within a range of color temperatures from about 2,600 K to about 6,000 K. Moreover, the programmable driver 1110 may be configured to emit light having varying color temperature in increments of about 50 K or 100 K increments. Furthermore, the programmable driver 1110 may be configured to operate the light engine 1130 to have a luminous intensity within the range from about 1 lumen to about 10,000 lumens.

As stated hereinabove, the beam angle of the luminaire 1000 may be varied according to user selection. More information regarding varying the beam angle may be found in U.S. patent application Ser. No. 13/739,893 titled "Tunable Lighting Apparatus" filed Jan. 11, 2013, the content of which is incorporate herein in its entirety. Specifically, the programmable driver 1110 may be configured to operate the plurality of LEDs 1132, and subsets thereof, to change the resulting beam angle of light emitted by the luminaire 1000. Moreover, in some embodiments, various configurations of the optic 1300 may be adapted to alter the beam angle of light emitted thereby, and one configuration may be selected for inclusion in the luminaire 1000 over another responsive to a user selection regarding beam angle.

The programmable driver 1110 may be any electrical device that may be programmed. More information regarding the programming of the programmable driver 1110 may be found in U.S. patent application Ser. No. 13/751,180 titled "Programmable Luminaire System" filed Jan. 28, 2013, the content of which is incorporated herein in its entirety by reference. The programmable driver 1110 may be an electronic device that is either configured to be programmed a finite number of times, or it may have as a structural limitation a finite number of times it can be programmed. Such electronic devices are known in the art, including, but not limited to, programmable read-only memory (PROM), field programmable read-only memory (FPROM), and one-time programmable non-volatile memory.

Furthermore, in some embodiments, the central member 1100 may further comprise a heat sink configured to increase the thermal dissipation capacity of the central member 1100. Additionally, the heat sink may be placed in thermal capacity with at least one of the light engine 1130, the power circuit 1120, and the programmable driver 1110.

Figure 5:
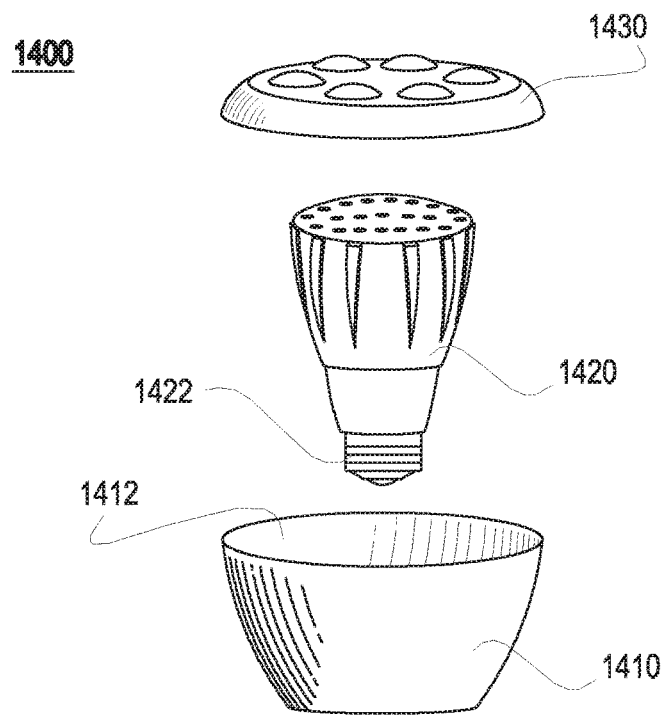
FIG. 5 is a perspective exploded view of a luminaire producible by an autonomous luminaire assembly and vending machine according to an embodiment of the present invention.

Referring now to FIG. 5, a luminaire 1400 as assembled by an autonomous assembling and vending system according to an embodiment of the invention is presented. The luminaire 1400 may comprise a housing 1410, a light module 1420, and an optic 1430. Each of the elements of the luminaire 1400 may be configured to couple to at least one other element of the luminaire 1400. Any method of coupling is contemplated and included within the scope of the invention, including all means and methods as described herein, specifically including snap-fits and lock tabs. In the present embodiment, the light module 1420 may be configured to couple to the housing 1410, and the optic 1430 may be configured to couple to the housing 1410.

The light module 1420 may include many features included in the central member 1100 of FIGS. 4a-b. Specifically, the light module 1420 may include a plurality of LEDs, a driver circuit positioned in electrical communication with the plurality of LEDs, and a power circuit configured to provide electrical power to the various electrical elements of the light module 1420. Additionally, in the present embodiment, the light module 1420 may include an electrical base 1422 positioned in electrical communication with the various electrical components of the light module 1420, either directly or indirectly. In the present embodiment, the inclusion of the electrical base 1422 in the light module 1420 means that an electrical connection between the electrical base 1422 will be established prior to the assembly of the luminaire 1400 by an autonomous assembling and vending system, thereby reducing the possibility of a failure to establish such a connection during assembly.

Furthermore, each of the housing 1410, the light module 1420, and the optic 1430 may be configured so as to be coupled with another element of the luminaire 1400 by the simple translation relative to the other element. For example, the light module 1420 may be configured to be coupled to the housing 1410 by translating longitudinally relative to the housing 1410 such that a section of the light module 1420 interfaces with and couples to a corresponding section of the housing 1410. Similarly, the optic 1430 may be configured to couple to the housing 1410 by translating longitudinally relative to the housing 1410 such that a section of the optic 1430 interfaces with and couples to a corresponding section of the housing 1410. Additional details regarding the coupling of the various elements of the luminaire 1400 will be discussed in greater detail hereinbelow.

Additionally, similar to the embodiments depicted in FIGS. 4a-b, the housing 1410 may include a reflective surface 1412. The reflective surface 1412 may be configured to redirect light incident thereupon in the direction of the optic 1430.

Figure 6:
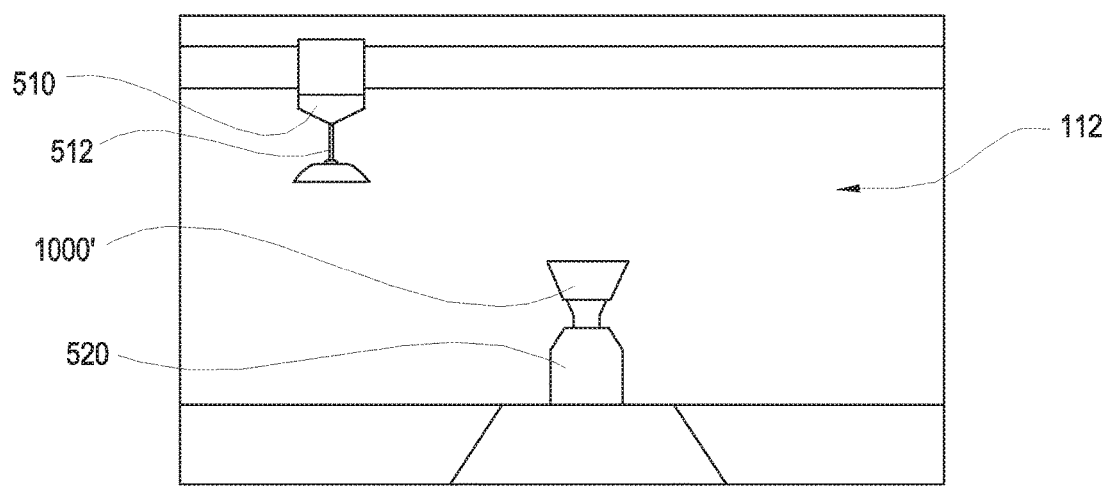
FIG. 6 is a side elevation view of the assembly system of FIG. 1 in a step of assembly.

Referring now to FIGS. 2, 4b and 6, additional aspects of the vending system 100 will now be discussed. The vending system 100 may be configured to include an assembly system 500, as stated hereinabove. The assembly system 500 may be configured to assemble the various components of a luminaire 1000, namely the central member 1100, the body member 1200, and the optic 1300, so as to produce the luminaire 1000. Moreover, the assembly system 500 may be configured so as to select and retrieve each of the components of the luminaire 1000 from a repository of components, the repository consisting of various configurations of each of the central member 1100, the body member 1200, and the optic 1300, so as to produce a luminaire according to user selections made as described hereinabove. The retrieval of the components of the luminaire 1000 may be accomplished by any known means or method, including the operation of a robotic device. In some embodiments, the assembly system 500 may include a transporting device 510.

The transporting device 510 may be configured to move through the assembly 120 and access the various components of the luminaire 1000 as stored in the repository of components. The transporting device 510 may be operated by the controller device 140 or by another controller associated with the assembly system 500. Additionally, the transporting device 510 may include a securing device 512 that is adapted to selectively secure a component to be included in a luminaire such that the component may be transported from, for example, the repository of components to another position in the assembly chamber 112 during the manufacture of the luminaire. The securing device 512 may be any device that is capable of securing a component during transport without damaging the component. The securing device 512 may include any device that may grasp, cling to, vacuum, or otherwise releasably adhere to a component.

Moreover, where a user selection indicates that the luminaire may include additional features embodied in an additional electrical device, such as a motion sensor, a wireless communication device, etc., the transporting device 510 may similarly be able to retrieve those additional electrical devices which may similarly be stored in the repository along with the aforementioned elements of the luminaire 1000.

The assembly system 500 may further include an assembly station 520. The assembly station 520 may be configured to permit the various components of the luminaire 1000 to be temporarily positioned on or within, and carried by, the assembly station 520 during the manufacture of the luminaire 1000. Additionally, in some embodiments, the assembly station 520 may be configured to apply a clamping force to a luminaire 1000 positioned thereupon during assembly. For example, referring now to FIG. 6, a partially-assembled luminaire 1000 is depicted during the manufacturing process. As can be seen, the partially-assembled luminaire 1000' is carried by the assembly station 520 while a step of the manufacturing process is being performed. Furthermore, in some embodiments, the assembly station 520 may be able to rotate a luminaire 1000 being carried thereby so as to facilitate the assembly of the luminaire 1000. The operation of the assembly station 520 may be controlled by the controller device 140 or by a controller associated with the assembly system 500, such a controller being alternatively the same as or separate and apart from the controller that operates the transporting device 510.

Figure 7:
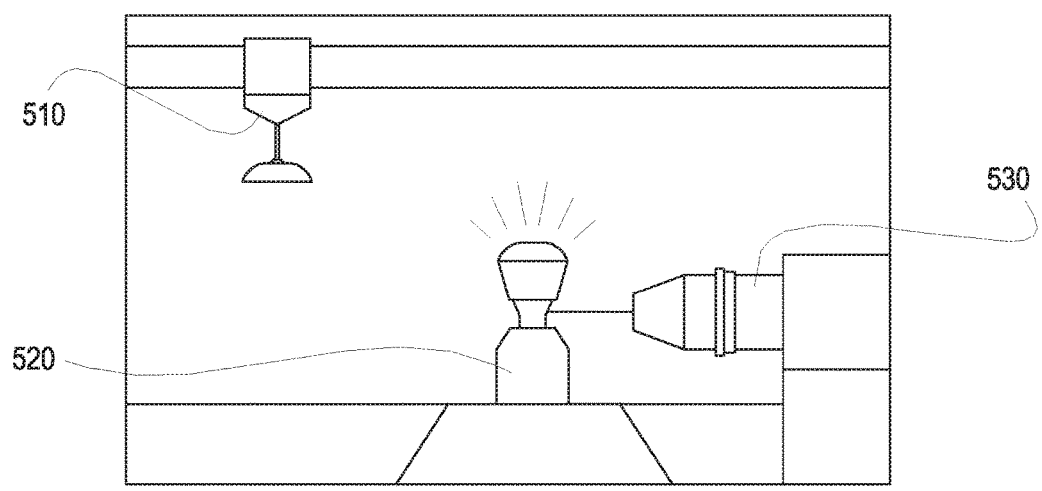
FIG. 7 is a side elevation view of the assembly system of FIG. 1 in a step of assembly subsequent of that of FIG. 6.

Referring now additionally to FIG. 7, an attaching device 530 of the assembly system 500 will now be discussed. As stated hereinabove, the various elements of the luminaire 1000 may be attached by any means or method known in the art, including, but not limited to, fasteners, interference fits, glues, adhesives, screw fits, and welding, including laser welding and ultrasonic welding. One or more of these attachments may be accomplished by at least one of the attaching device 530 and the transporting device 510. For example, in some embodiments, the attaching device 530 may comprise a welding device, such as a laser. The attaching device 530 may be configured to laser weld the various components of the luminaire 1000 to each other. Similar to the transporting device 510, the attaching device 530 may be operated by the controller device 140 or a controller associated with the assembly system 500, which may the same as or separate and apart from the controller that may control either of the transporting device 510 and/or the assembly station 520.

The assembly system 500 may further comprise one or more sensors configured to facilitate the assembly of the luminaire 1000. For example, the assembly system 500 may include an optical sensor configured to capture an image of the luminaire 1000 during assembly. The optical sensor may allow the assembly system 500 to determine or confirm the orientation of one or more of the elements of the luminaire 1000 so as to ensure proper assembly thereof. Furthermore, an image may be captured of the luminaire 1000 to confirm the proper assembly of the luminaire 1000 and to provide evidence against any future claims that may be disproved by the image. Additionally, the optical sensor may be configured to measure lighting characteristics, and the assembly system 500 may be configured to cause the luminaire 1000 to emit light, so as to at least one of confirm the luminaire 1000 emits light having the proper characteristics, which may be determined by the optical sensor, and to allow the user to observe the luminaire 1000 in operation and permit the user to select different characteristics if they so desire. Furthermore, the assembly system 500 may include an electrical sensor configured to determine whether any shorts exist in the electrical components of the luminaire 1000 and to ensure proper electrical behavior.

As described in the reference "Programmable Luminaire System" mentioned hereinabove, and as incorporated herein by reference, the programmable driver 1110 may be programmed by a variety of methods. In some embodiments, the assembly station 520 may establish electrical communication with the programmable driver 1110 while the luminaire 1000 is carried by the assembly station 520. In some other embodiments, once the light module 1130 has been placed in electrical communication with the programmable driver 1110, the programmable driver 1110 may be programmed by the reception of light that is configured to program the programmable driver 1110 according to visible light communication principles, which is discussed in greater detail in U.S. patent application Ser. No. 13/268,222 titled "Wavelength Sensing Light Emitting Semiconductor and Associated Methods" filed Oct. 7, 2011, the content of which is incorporated by reference herein in its entirety.

Additionally, in some embodiments, the vending system 100 may additionally include a lighting socket. The lighting socket may be positioned such that a user may attach and position in electrical communication a luminaire 1000 as described hereinabove. For example, the lighting socket may be positioned on or extending from the front face 114 of the housing 110. The vending system 100 may be configured to reprogram the programmable controller 1130 of the luminaire 1000 so as to alter the lighting characteristics thereof.

Referring now back to FIG. 2, the packaging system 600 will now be discussed in greater detail. In some embodiments, once a luminaire has been completely assembled, it may be packaged so as to protect the luminaire. The type of packing employed by the packaging system 600 may be any type of packaging known in the art. For example, in some embodiments, the packaging system 600 may employ clamshell packaging, with each luminaire being positioned within a clamshell container. The configuration of the clamshell container may be such that any bulb that may be assembled by the vending system 100 may be positioned within the clamshell container. Furthermore, in some embodiments, the packaging system 600 may include a variety of configurations of clamshell containers, with each configuration being adapted to permit one or more of the luminaires that may be assembled by the vending system 100 to be positioned therewithin. Furthermore, the packaging system 600 may additionally include any other device that may facilitate the packaging of a luminaire, including crimping tools, heat-sealing tools, and the like. Furthermore, while clamshell packaging is discussed, it is contemplated that the packaging system 600 may utilize any packaging method that is known in the art, and may include any devices necessary or advantageous to accomplish those packaging methods. Furthermore, in some embodiments, the vending system 100 may not include a packaging system 600, and may deliver unpackaged luminaires to the user.

Continuing to refer to FIG. 2, the dispensing system 700 will now be discussed in greater details. The dispensing system 700 may be configured to receive assembled luminaires, either directly from the assembly system 500 or after being packaged by the packaging system 600, and delivering them to the user. In some embodiments, the delivering system 700 may be a channel that directs a luminaire to the dispensing section 130 of the housing 110, specifically into the dispensing chamber as discussed hereinabove. In some embodiments, where the vending system 100 is configured to assemble one or more luminaires in advance of the user picking them up, the dispensing system 700 may include a holding section within which assembled (and optionally packaged) luminaires may be stored prior to their retrieval by the user. In some embodiments, the various elements of the assembly system 500 may be employed to assist in the positioning of assembled luminaires in the holding section and their retrieval therefrom when the user arrives at the vending system 100 and requests delivery thereof. More specifically, the transporting device 510 may be configured to carry and place luminaires within the holding section upon assembly, and to retrieve and deliver the luminaires to the delivery system 700 when the user arrives to retrieve the luminaires. As such, the delivery system 700 may maintain a database of luminaires stored in the holding section along with their location. Such a database may be maintained by a controller device and memory associated with the delivery system 700, such as, in some embodiments, the controller device 140 and the memory 150. Accordingly, when a user arrives at the vending system 100 after having previously ordered one or more luminaires, the delivery system 700 may deliver the previously ordered luminaires at that time.

Figure 8A:
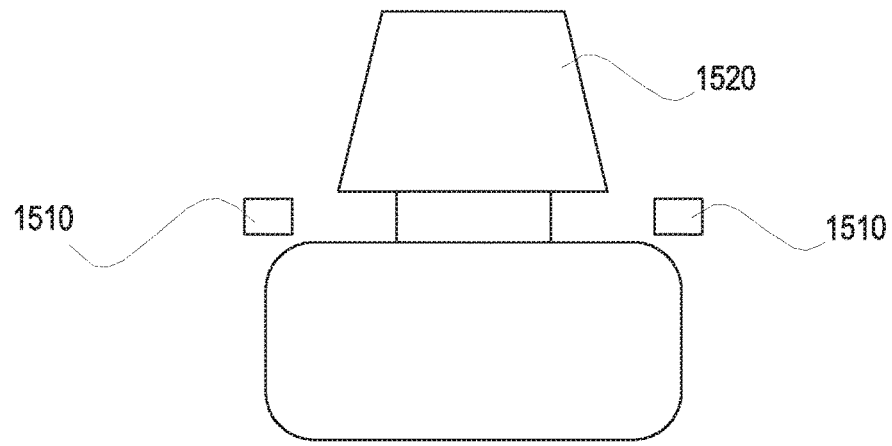
FIG. 8a is side elevation view of a step in an assembly process according to an embodiment of the invention.

Referring now to FIGS. 8*a-d*, a method of assembling a luminaire according to an embodiment of the invention is depicted. More specifically, a method of operating a CNC device, as described hereinabove, so as to assemble a luminaire is presented. The present embodiment, the CNC device may include a gripping mechanism 1510. The gripping mechanism 1510 may be configured so as to removably attached to one or more elements of the luminaire to be assembled. Referring now to FIG. 8*a*, the gripping mechanism 1510 is illustrated in a pre-attachment position adjacent to a light module 1520. The light module 1520 may be any source of light as described hereinabove, including either of the light module 1420 of FIG. 5. Alternatively, the light module 1520 may be any element of a luminaire described as containing a light-producing element, such as the central member 1100 of FIGS. 4*a-b*. The CNC device may have retrieved the light module 1520 from a repository of light modules, as will be described in greater detail hereinbelow.

Figure 8B:
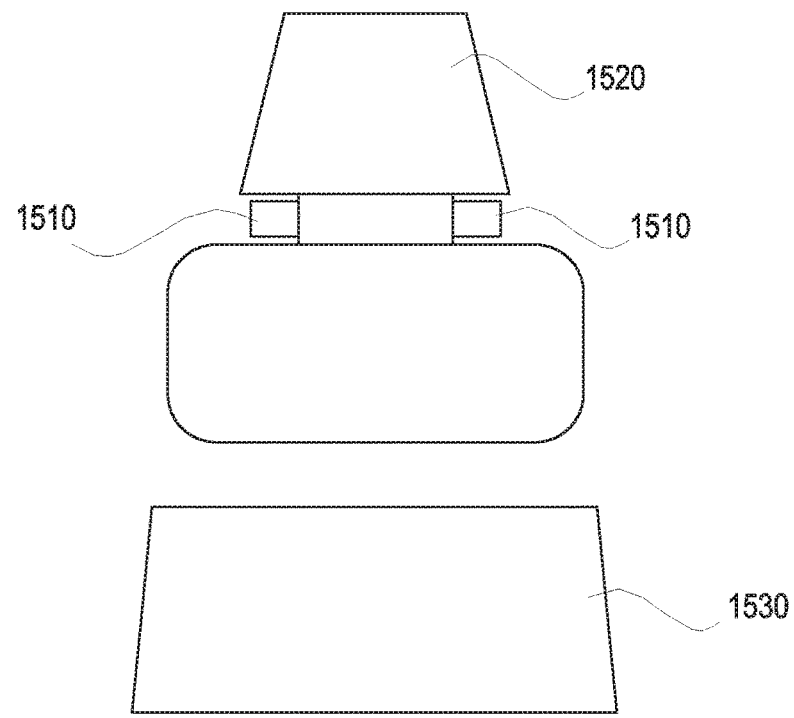

In FIG. 8*b*, the gripping mechanism 1510 is illustrated as being removably attached to the light module 1520 by grasping the light module 1520. Additionally, the CNC device has positioned a housing 1530 so as to be positioned adjacent to the light module 1520. More specifically, the CNC device has positioned the housing 1530 so as to be adjacent to a section of the light module 1520 containing a plurality of LEDs. The CNC device may have retrieved the housing 1530 from a repository of housings, as will be described in greater detail hereinbelow.

Figure 8C:
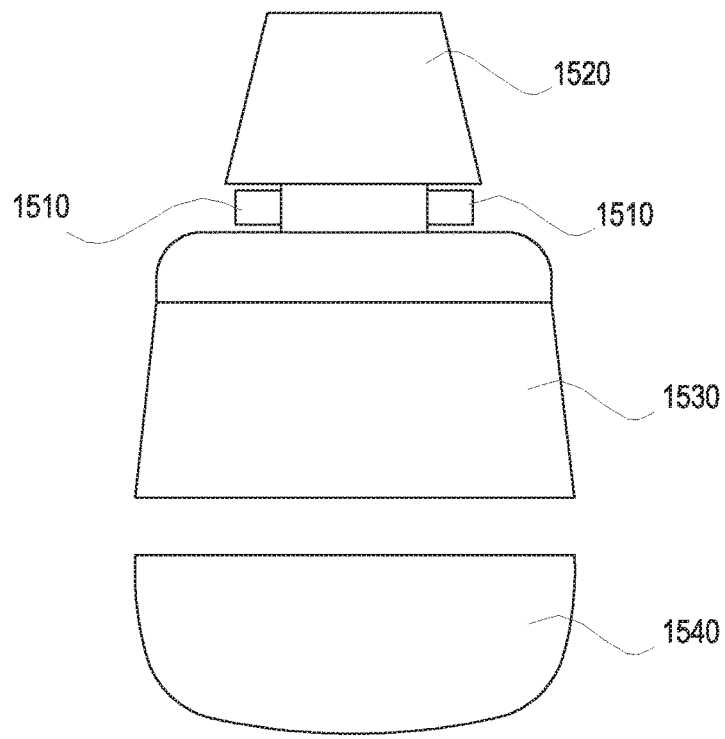
FIG. 8c is a side elevation view of a step in the assembly process subsequent to the step depicted in FIG. 8b.

In FIG. 8*c*, the CNC device has translated the light module 1520 so as to cause the light module 1520 to couple with the housing 1530. Any type of coupling is contemplated to be included within the scope of the invention, as described above. In the present embodiment, each of the light module 1520 and the housing 1530 may be configured to couple by including structures that enable the elements to snap and/or lock together. Accordingly, the translation of the light module 1520 may cause the structures of the light module 1520 to interact with the structures of the housing 1530 to snap together.

Additionally, the CNC device may have retrieved an optic 1540 from a repository of optics, as will be described in greater detail hereinbelow. Furthermore, the CNC device may have positioned each of the optic 1540 and the now-combined light module 1520 and housing 1530 such that an end of the housing 1530 is generally adjacent to the optic 1540.

Figure 8D:
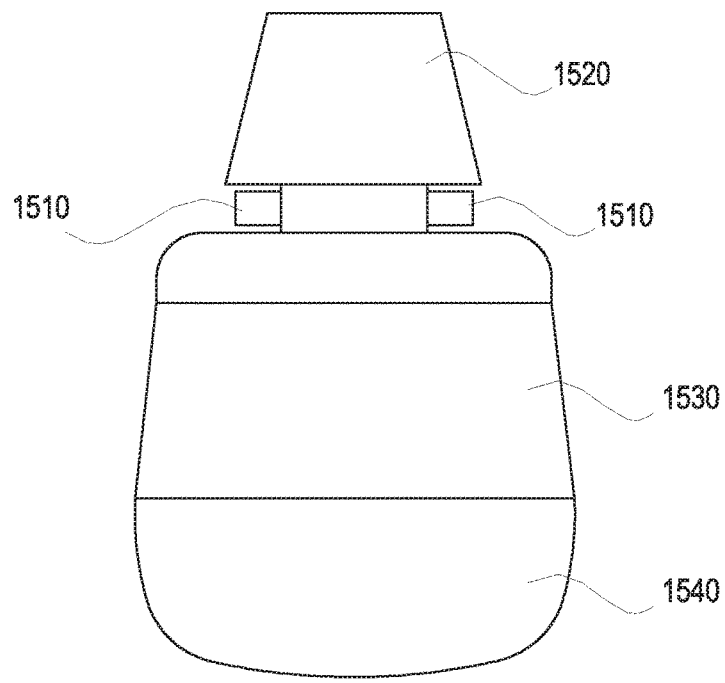
FIG. 8d is a side elevation view of a step in the assembly process subsequent to the step depicted in FIG. 8c.

In FIG. 8*d*, the CNC device has translated each of the light module 1520 and the housing 1530 so as to cause the housing 1530 to couple with the optic 1540. Any method of coupling the housing 1530 and the optic 1540 is contemplated and intended to be included within the scope of the invention. In some embodiments, the method of coupling employed in coupling the housing 1530 to the optic 1540 may be the same as that employed in coupling the light module 1520 to the housing 1530. In other embodiments, the method of coupling may be different. Furthermore, as in the present embodiment, each of the housing 1530 and the optic 1540 may include structures enabling the coupling of the housing 1530 and the optic 1540 by snapping together. Accordingly, the housing 1530 may be coupled to the optic 1540 by translating the housing 1530 so as to cause the structures of the housing 1530 to interact with the structures of the optic 1540 and to snap together.

The method of assembly depicted in FIGS. 8*a-d* advantageously does not require the use of any coupling techniques, such as welding, fusing, the use of fasteners, the use of glues adhesives, and the like. However, the use of such coupling techniques is contemplated and intended to be included within the scope of the invention.

Figure 9:
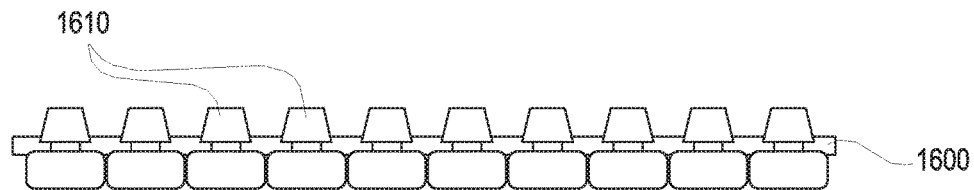
FIG. 9 is a side elevation view of a carrier of light modules of an autonomous luminaire assembly and vending system according to an embodiment of the present invention and showing a plurality of light modules being carried thereby.

Referring now to FIG. 9, a carrier 1600 for light modules will now be discussed. The carrier 1600 may be configured to carry a plurality of light modules 1610 as recited hereinabove. Additionally, the carrier 1600 may be configured to carry the plurality of light modules 1610 so as to enable a computer-controlled manipulation device to retrieve a light module therefrom. Accordingly, in some embodiments, the carrier 1600 may be configured to permit a light module to be removably attached thereto, such that a computer-controlled manipulation device may remove the light module from the carrier 1600 for use in assembling a luminaire.

In the present embodiment, the carrier 1600 may include a plurality of slots within each of which a light module may be carried thereby. Each slot may be configured to carry a light module such that the light module may be removed therefrom by the translation of the light module by a gripping device, such as the gripping mechanism 1510 as described hereinabove. Moreover, the slots may be configured to carry a variety of light module types.

In some embodiments, the carrier 1600 may be configured to be carried by an autonomous assembling and vending system, more specifically by stored in a parts repository thereof. Additionally, in some embodiments, the carrier 1600 may be configured so as to be transportable from a parts repository of an autonomous assembling and vending system to an assembly section of the system. More details regarding the transportation of the carrier 1600 are provided hereinbelow.

Figure 10:
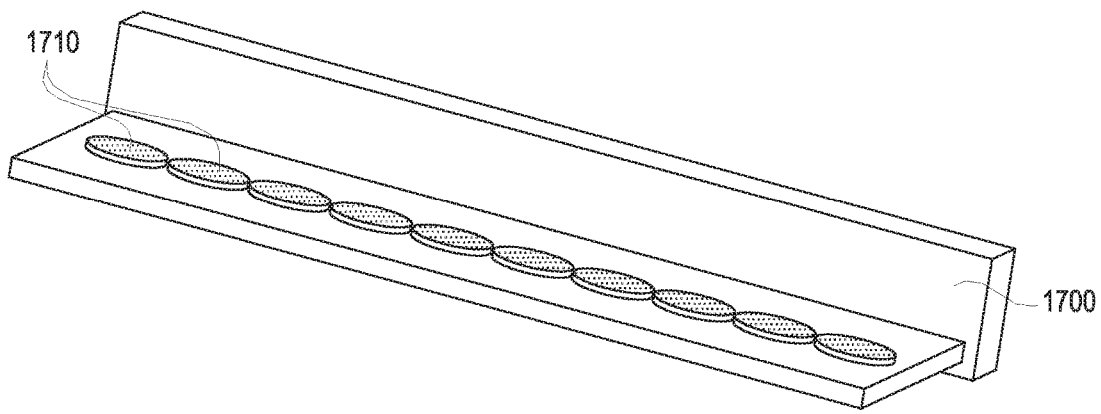
FIG. 10 is a perspective view of a carrier of luminaire housings of an autonomous luminaire assembly and vending system according to an embodiment of the present invention and showing a plurality of luminaire housings being carried thereby.

Referring now to FIG. 10, a carrier 1700 for luminaire housings will now be discussed. The carrier 1700 may be configured to carry a plurality of luminaire housings 1710 of any type, including those disclosed hereinabove. Additionally, the carrier 1700 may be configured to carry the plurality of housings 1710 so as to enable a computer-controlled manipulation device to retrieve a housing therefrom. Accordingly, in some embodiments, the carrier 1700 may be configured to permit a housing to be removably attached thereto, such that a computer-controlled manipulation device may remove the housing from the carrier 1700 for use in assembling a luminaire.

In the present embodiment, the carrier 1700 may include a plurality of slots. A housing may be carried by each of the plurality of slots. Each slot may be configured to carry a housing in a position that facilitates the attachment of the housing to another structure of a luminaire to be assembled. More specifically, each slot may be configured to carry a housing and positioned so as to facilitate the attachment of a light module such that the translation of the light module relative to the housing by a computer-controlled manipulation device may cause the light module to couple to the housing, such as the method of attachment illustrated in FIGS. 8*a-d*. Additionally, the slots may be configured to carry a variety of housing types.

Additionally, in some embodiments, the carrier 1700 may be configured so as to be transportable from a parts repository of an autonomous assembling and vending system to an assembly section of the system. More details regarding the transportation of the carrier 1700 are provided hereinbelow.

Figure 11:
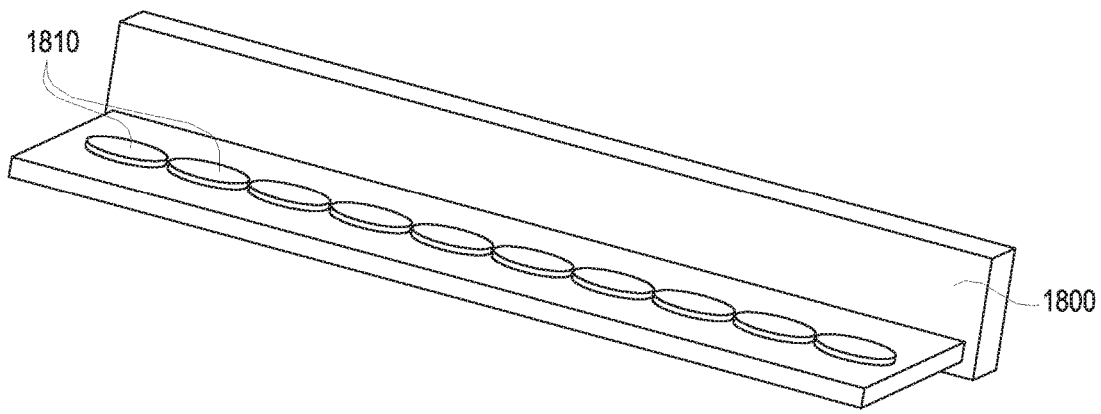
FIG. 11 is a perspective view of a carrier of optics of an autonomous luminaire assembly and vending system according to an embodiment of the present invention and showing a plurality of optics being carried thereby.

Referring now to FIG. 11, a carrier 1800 for optics will now be discussed. The carrier 1800 may be configured to carry a plurality of optics 1810 of any type, including those disclosed hereinabove. Additionally, the carrier 1800 may be configured to carry the plurality of optics 1810 so as to enable a computer-controlled manipulation device to retrieve an optic therefrom. Accordingly, in some embodiments, the carrier 1800 may be configured to permit an optic to be removably attached thereto, such that a computer-controlled manipulation device may remove the optic from the carrier 1800 for use in assembling a luminaire.

In the present embodiment, the carrier 1800 may include a plurality of slots within each of which an optic may be carried thereby. Each slot may be configured to carry an optic in a position that facilitates the attachment of the optic to another structure of a luminaire to be assembled. More specifically, each slot may be configured to carry an optic and positioned so as to facilitate the attachment of a housing such that the translation of the housing relative to the optic by a computer-controlled manipulation device may cause the housing to couple to the optic, such as the method of attachment illustrated in FIGS. 8*a-d*. Additionally, the slots may be configured to carry a plurality of optic types.

Figure 12A:
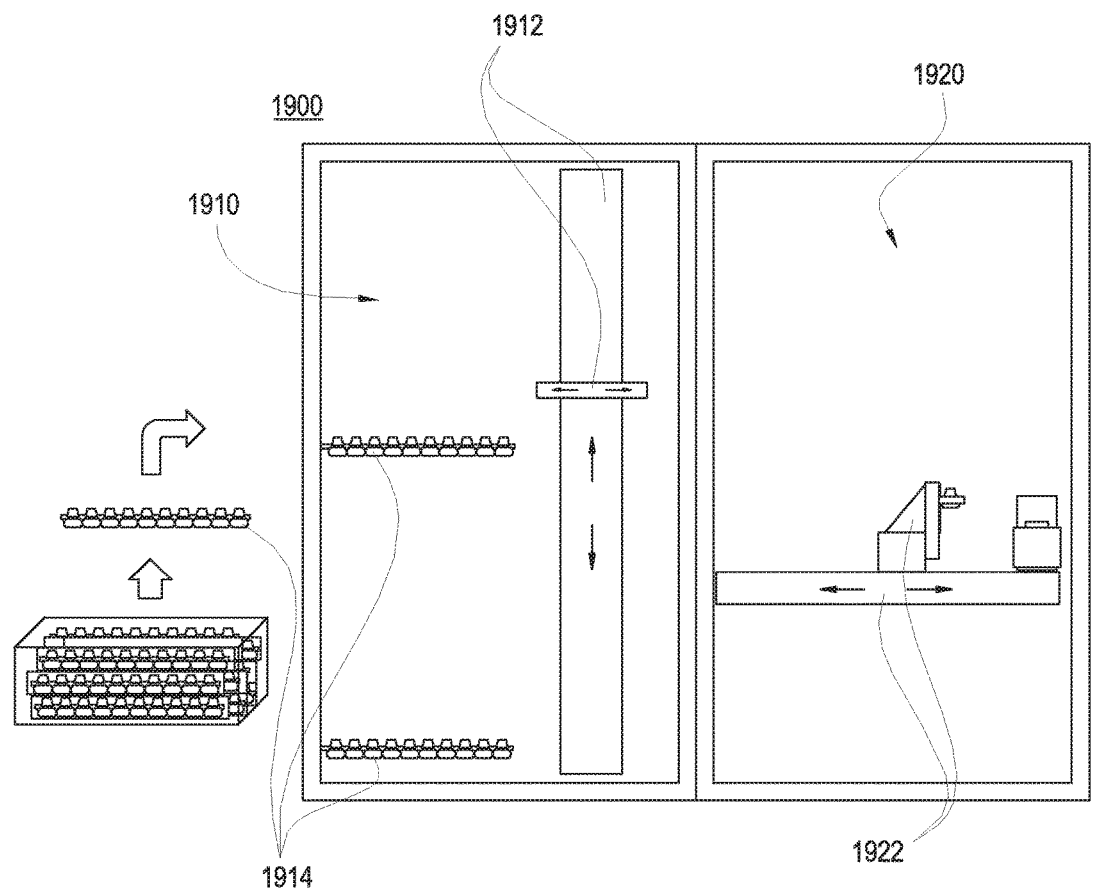
FIGS. 12a-c are schematic views of a parts repository of an autonomous luminaire assembly and vending system according to an embodiment of the present invention and illustrating a stocking procedure.
Figure 12B:
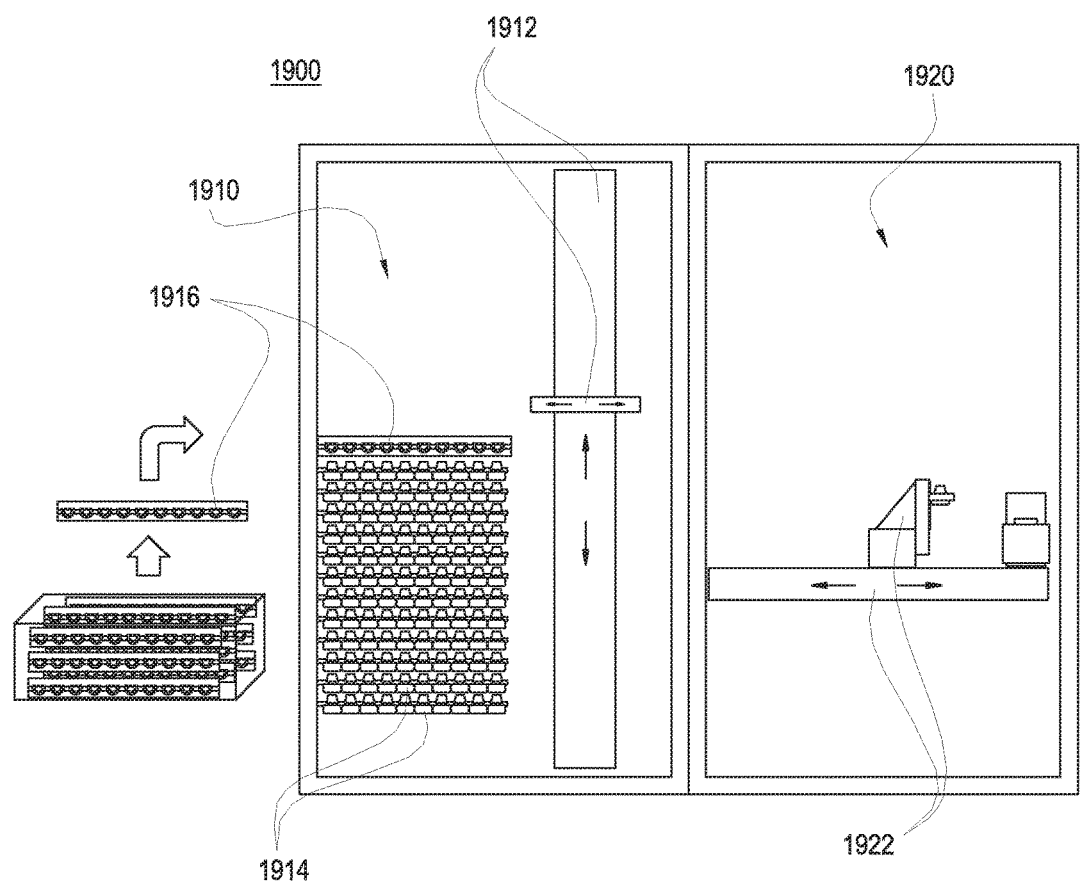
Figure 12C:
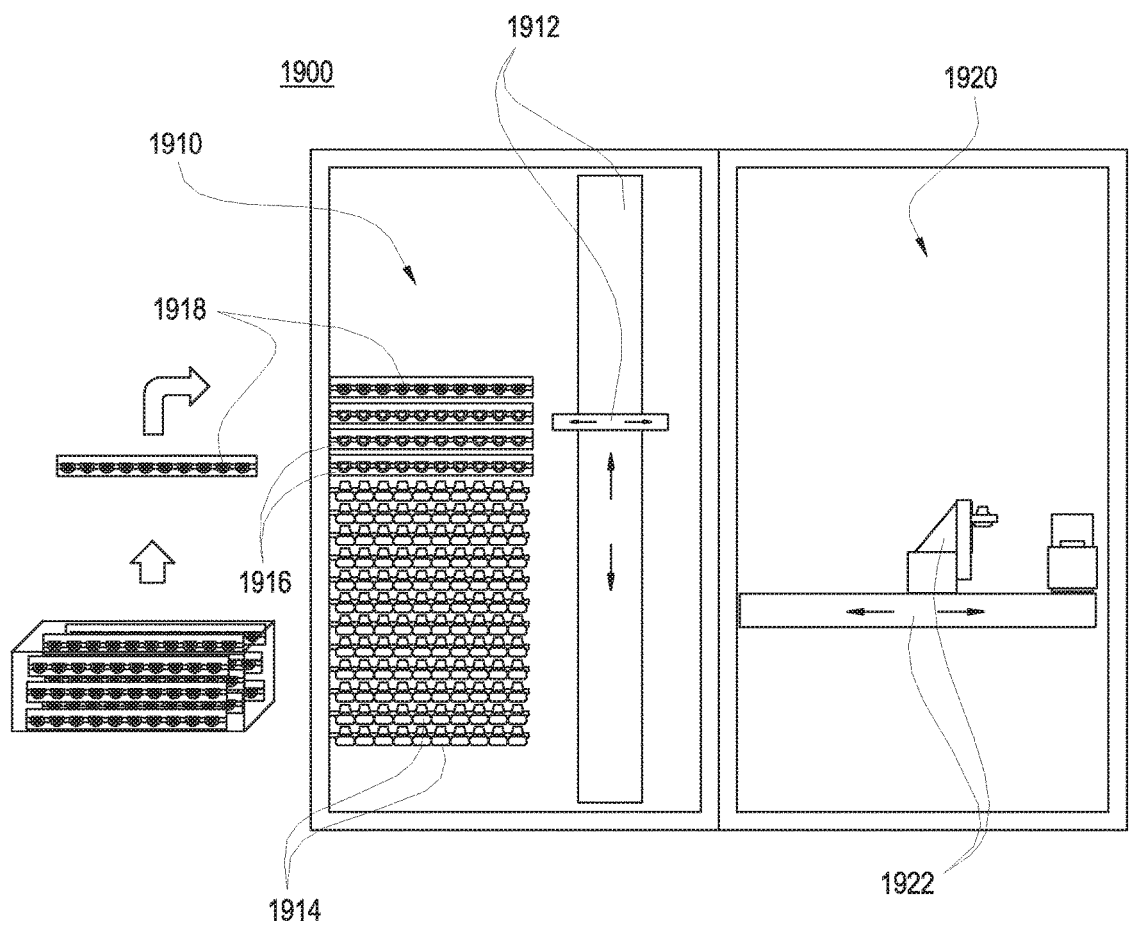

Referring now to FIGS. 12*a-c*, a stocking procedure of an autonomous assembling and vending system according to an embodiment of the invention is presented. In the present embodiment, the vending system 1900 may include a parts repository 1910 and an assembling section 1920. The parts repository 1910 may comprise a parts retrieval system 1912. The parts retrieval system 1912 may be a computer-controlled device configured to retrieve parts of a luminaire from the parts repository 1910 and deliver the retrieved parts to the assembling section 1920. More specifically, the parts retrieval system may position the retrieved parts so as to be accessible by a computer-controlled manipulation device 1922 of the assembling section 1920. In some embodiments, the parts retrieval system 1912 may be considered to be an element of the computer-controlled manipulation device 1922, and may be controlled by a common controller device.

The parts repository 1910 may be configured to permit the positioning therein of a plurality of parts for use in assembling a luminaire. Additionally, in some embodiments, the parts repository 1910 may be configured to permit the positioning therein a plurality of carriers of the various parts used in assembling a luminaire. Moreover, the parts repository 1910 may be configured to permit the positioning of carriers therewithin so as to facilitate the retrieval of the carriers by the parts retrieval system 1912 for delivery to the assembling section 1920.

For example, referring now specifically to FIG. 12*a*, a plurality of carriers of light modules 1914 are depicted in the process of being positioned within the parts repository 1910 characterized as stocking the parts repository 1910, thereby stocking the vending system 1900. The plurality of carriers of light modules 1914 may be positionable within the parts repository so as to minimize the space occupied by each carrier, thereby increasing the number of carriers of light modules 1914 that may be positioned therein. The carriers of light modules 1914 may be the carrier of light modules 1600 illustrated in FIG. 9. Moreover, in the present embodiment, the carriers of light modules 1914 may be configured to stacked on top of one another. In another embodiment, the carriers of light modules 1914 may be configured to be carried by a structure of the parts repository 1910.

Referring now specifically to FIG. 12*b*, the plurality of carriers of light modules 1914 are shown as completely stocked, namely, that the total number of carriers of light modules 1914 desired to be positioned within the parts repository 1910 are so positioned. In some embodiments, the volume of the parts repository 1910 that is occupiable by the carriers of light modules 1914 may be less than a total volume of the parts repository 1910 that may be occupied by parts to be used in the assembly of luminaires. In other embodiments, the volume of the parts repository 1910 that is occupiable by the carriers of light modules 1914 may be up to the total volume of the parts repository 1910 that may be occupied by parts to be used in the assembly of luminaires.

Additionally, a plurality of carriers of optics 1916 are depicted in the process of being positioned within the parts repository 1910, thereby stocking the vending system 1900 with optics. In the present embodiment, the carriers of optics 1916 are being positioned generally above the carriers of light modules 1914. Any arrangement of the carriers of the optics and light modules 1916, 1914 is contemplated and included within the scope of the invention.

The plurality of carriers of optics 1916 may be positionable within the parts repository so as to minimize the space occupied by each carrier, thereby increasing the number of carriers of optics 1916 that may be positioned therein. The carriers of optics 1916 may be the carrier of optics 1700 illustrated in FIG. 10. Moreover, in the present embodiment, the carriers of optics 1916 may be configured to stacked on top of one another. In another embodiment, the carriers of optics 1916 may be configured to be carried by a structure of the parts repository 1910.

Referring now specifically to FIG. 12*a*, the plurality of carriers of optics 1916 are shown as completely stocked, namely, that the total number of carriers of optics 1916 desired to be positioned within the parts repository 1910 are so positioned. In some embodiments, the volume of the parts repository 1910 that is occupiable by the carriers of optics 1916 may be less than a total volume of the parts repository 1910 that may be occupied by parts to be used in the assembly of luminaires. In other embodiments, the volume of the parts repository 1910 that is occupiable by the carriers of optics 1916 may be up to the total volume of the parts repository 1910 that may be occupied by parts to be used in the assembly of luminaires.

Additionally, the proportion of the volume of the parts repository 1910 occupied by the carriers of optics 1916 may be a proportion of the volume occupied by the carriers of light modules 1914. The proportion may be controlled by configuring the parts repository 1910 to carry various numbers of either of the carriers of light modules 1914 and carriers of optics 1916. The number of the respective types of carriers to be carried by the parts repository 1910 may be determined based on consideration of a variety of factors, including, but not limited to, optic size, number of types and sizes of optics, volume of space occupied by various optic types, volume of space occupied by optics when being carried by carriers of optics 1916, anticipated usage rates of various types of optics, light module size, volume occupied by light modules when carried by carriers of light modules 1914, light module types, and anticipated usage rate of light modules.

Additionally, a plurality of carriers of housings 1918 are depicted in the process of being positioned within the parts repository 1910, thereby stocking the vending system 1900 with housings. In the present embodiment, the carriers of housings 1918 may preferably be positioned generally above the carriers of optics 1916. Any arrangement of the carriers of the housings, optics and light modules 1918, 1916, 1914 is contemplated and intended to be included within the scope of the invention.

The total number of carriers of housings 1918 total desired to be positioned within the parts repository 1910 are so positioned may be any number. In some embodiments, the volume of the parts repository 1910 that is occupiable by the carriers of housings 1918 may be less than a total volume of the parts repository 1910 that may be occupied by parts to be used in the assembly of luminaires. In other embodiments, the volume of the parts repository 1910 that is occupiable by the carriers of housings 1918 may be up to the total volume of the parts repository 1910 that may be occupied by parts to be used in the assembly of luminaires.

Additionally, the proportion of the volume of the parts repository 1910 occupied by the carriers of housings 1918 may be a proportion of the volume occupied by either of the carriers of light modules 1914 or the carriers of optics 1916, or both. The proportion may be controlled by configuring the parts repository 1910 to carry various numbers of the carriers of light modules 1914, the carriers of optics 1916, and the carriers of housings 1918. The number of the respective types of carriers to be carried by the parts repository 1910 may be determined based on consideration of a variety of factors, including the factors listed above, as well as the size of the housings, the various types of housings, the volume occupied by housings when carried, and the anticipated usage rate of the various types of housings.

Figure 13A:
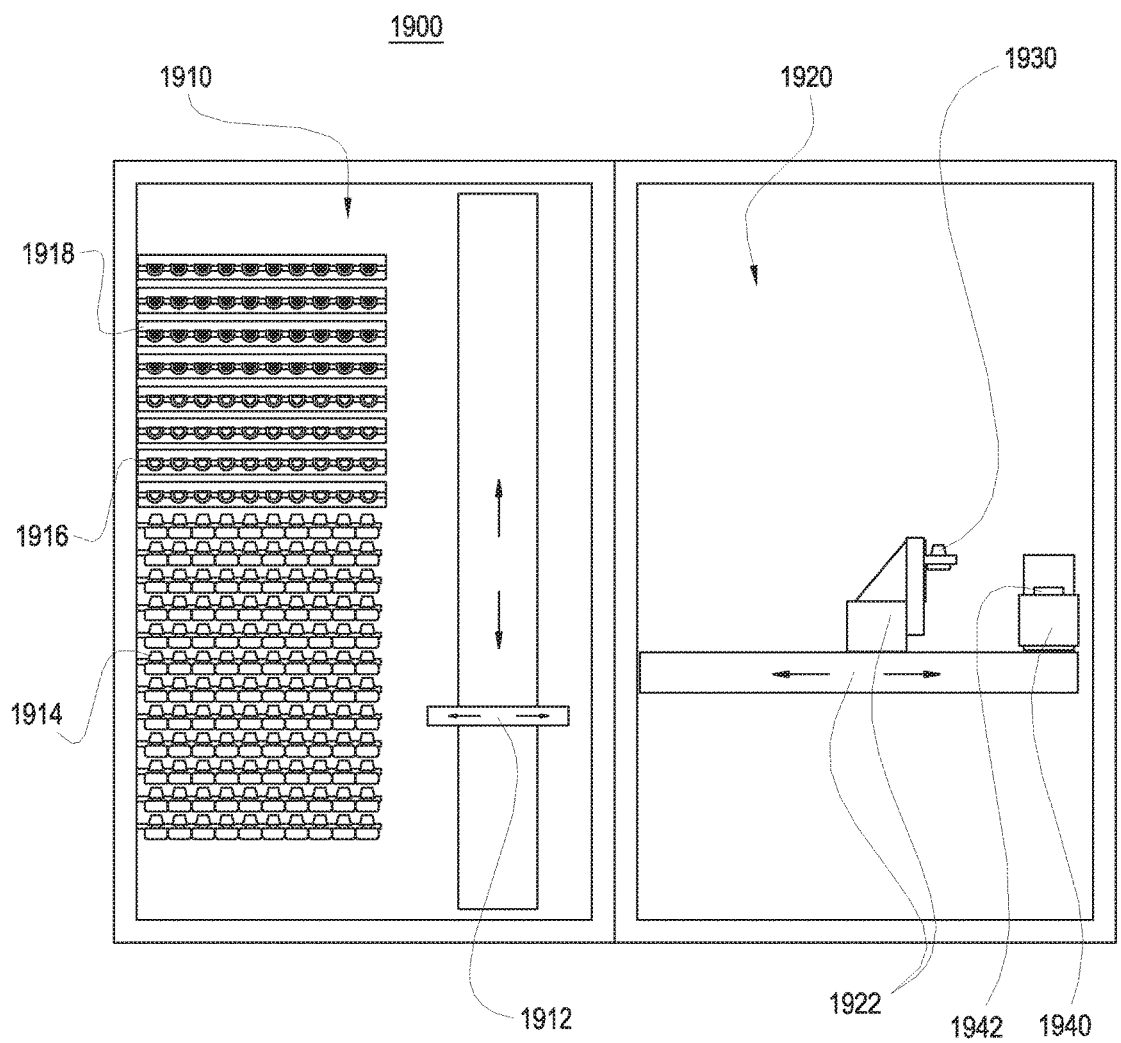
FIGS. 13a-e are schematic views of an autonomous luminaire assembly and vending system according to an embodiment of the present invention and showing a parts retrieval procedure.

Referring now to FIGS. 13*a-e*, a parts retrieval process according to an embodiment of the invention will now be discussed. Referring now specifically to FIG. 13*a*, the parts retrieval system 1912 is depicted in a holding position, and the computer-controlled manipulation device 1922 is depicted as having already retrieved a light module 1930. More specifically, a tray 1913 of the parts retrieval system 1912 is positioned generally adjacent to the computer-controlled manipulation device 1922. Additionally, the parts repository 1910 may comprise a plurality of light module carriers 1914, a plurality of optic carriers 1916, and a plurality of housing carriers 1918. Furthermore, the parts repository may comprise a plurality of types of light modules, a plurality of types of optics, and a plurality of types of housings carried by their respective carriers 1914, 1916, 1918.

Figure 13B:
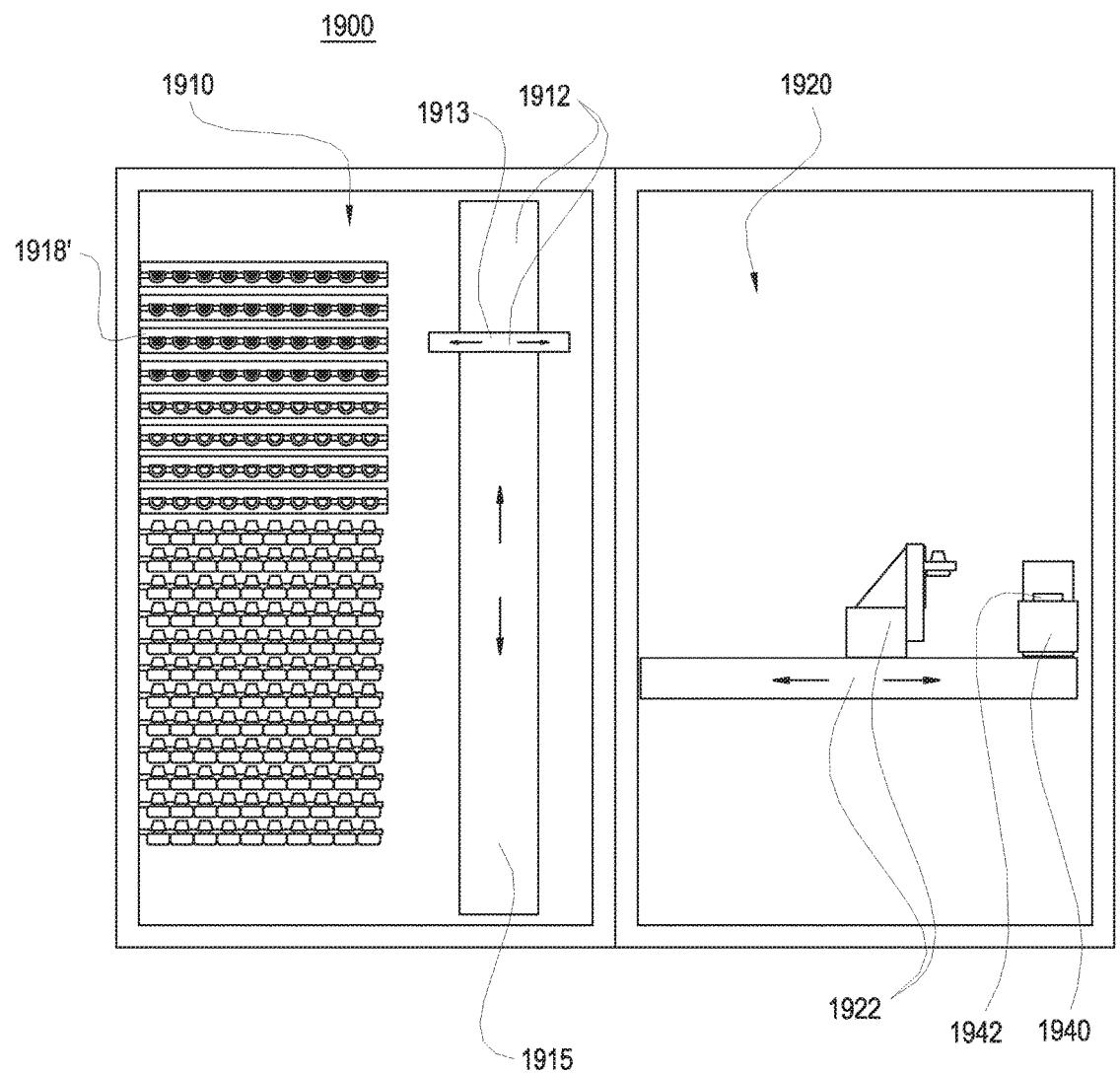

Referring now specifically to FIG. 13*b*, the tray 1913 has been moved along a vertical axis 1915 of the parts retrieval system 1912 so as to be generally aligned with a housing carrier 1918 of the plurality of housing carriers 1918. The moving of the tray 1913 along the vertical axis 1915 may be accomplished by any means or method known in the art, including the operation of a mechanical system to cause the tray 1913 to ascend or descend. The movement of the tray 1913 may be controlled by a controller device, as described hereinabove.

Figure 13C:
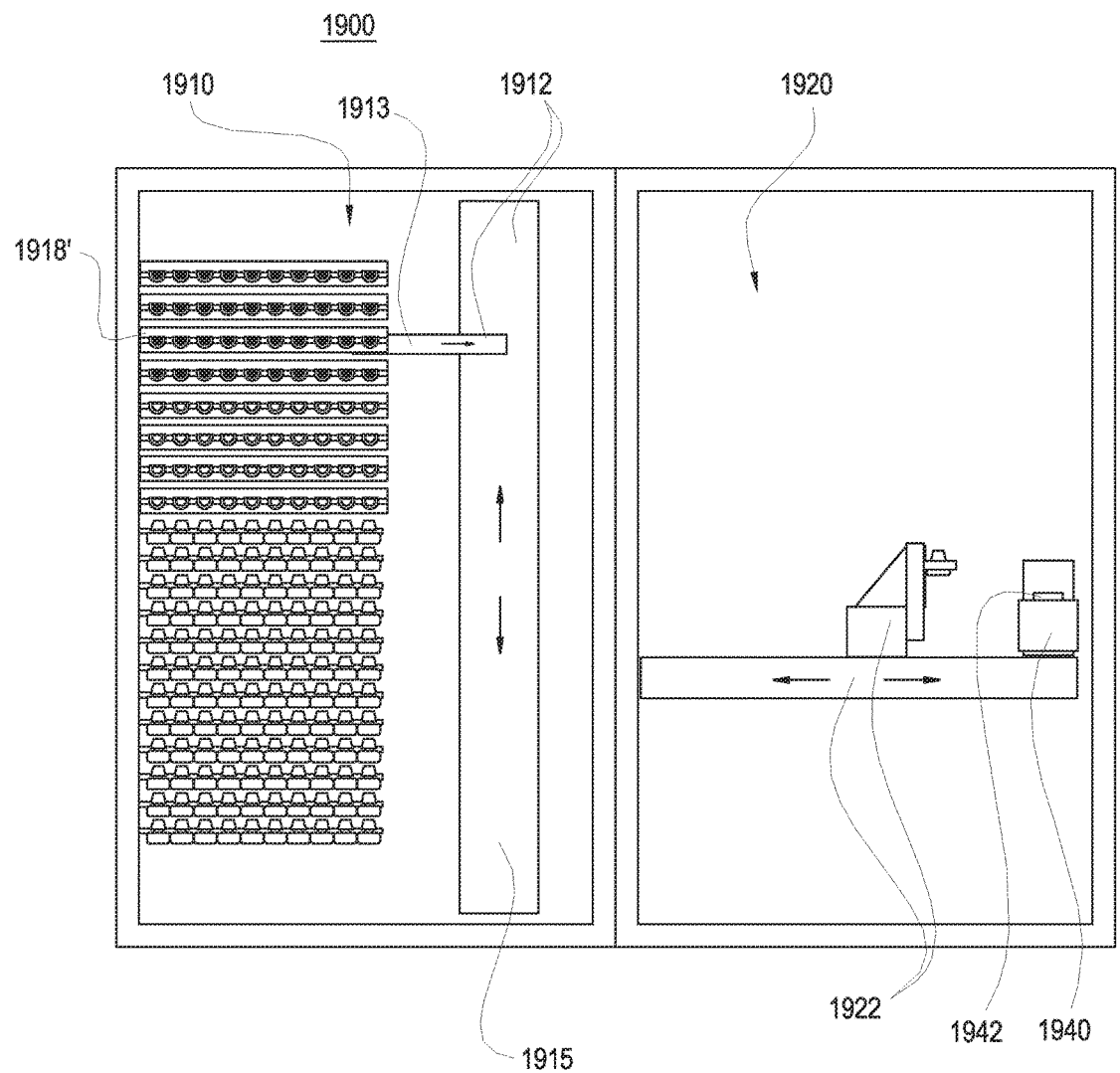

Referring now specifically to FIG. 13*c*, the tray 1913 has been positioned so as to interface with the housing carrier 1918'. In some embodiments, the tray 1913 may be configured to be translatable horizontally so as to interface with the housing carrier 1918' and any other carrier associated with the parts repository 1910. Additionally, the tray 1913 may be translatable horizontally so as to be moved along the vertical axis 1915 without interfering or coming into contact with any carrier of the parts repository 1910 during movement. In some embodiments, the tray 1913 may be extendable so as to interface with the housing carrier 1918'.

Additionally, the interface between the tray 1913 and the housing carrier 1918' may be enable the tray 1913 to move the housing carrier 1918'. More information regarding the moving of the housing carrier 1918' may be found hereinbelow.

Figure 13D:
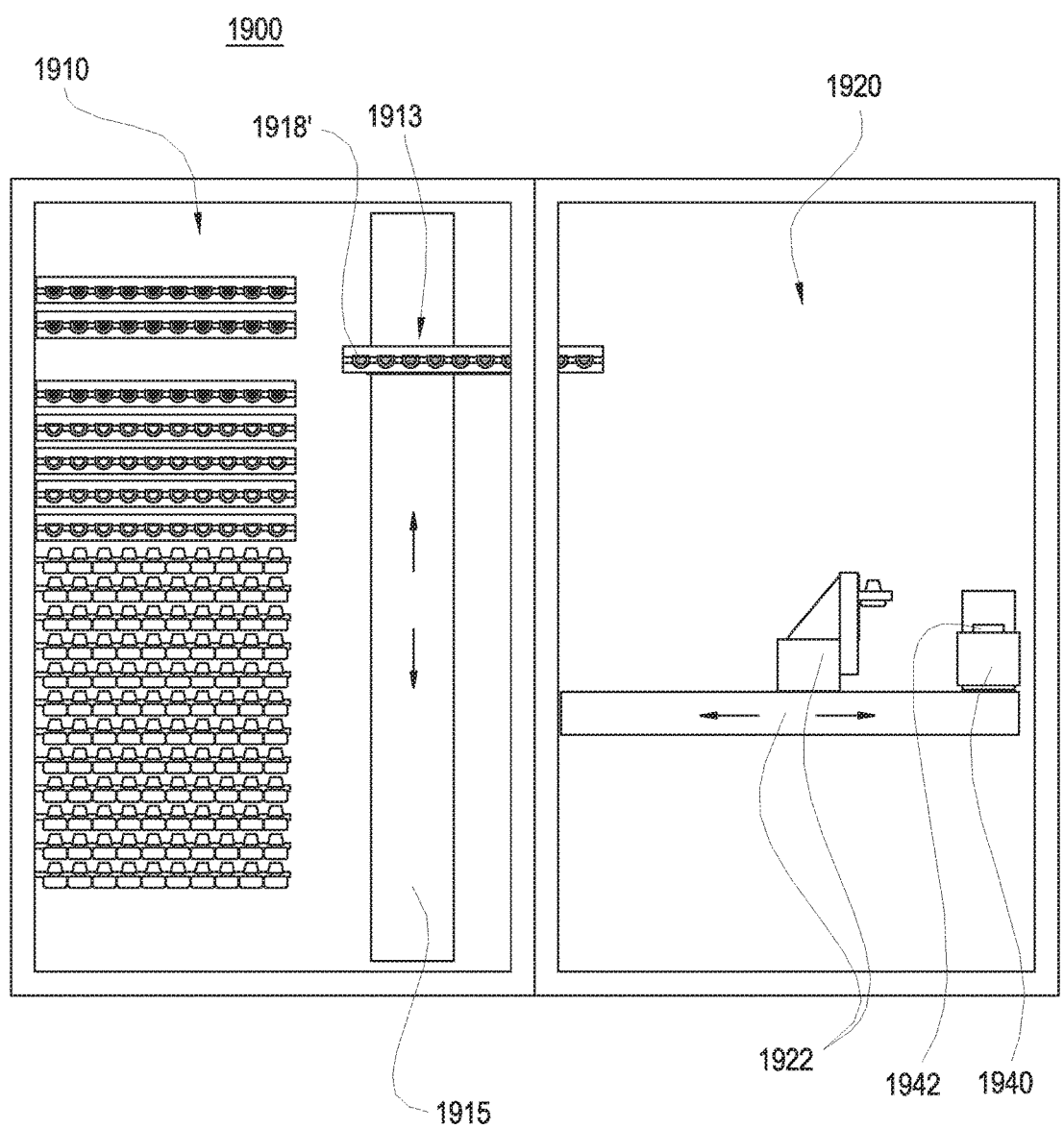

Referring now specifically to FIG. 13*d*, the tray 1915 has moved the housing carrier 1918' horizontally such that, upon vertical translation of each of the tray 1913 and the housing carrier 1918', the housing carrier 1918' will not interfere with or come into contact with any other carrier of the parts repository 1910. Accordingly, the tray 1913 may be configured to enable such horizontal movement of the housing carrier 1918' while maintaining control of the housing carrier 1918', specifically, preventing the housing carrier 1918' from falling.

Figure 13E:
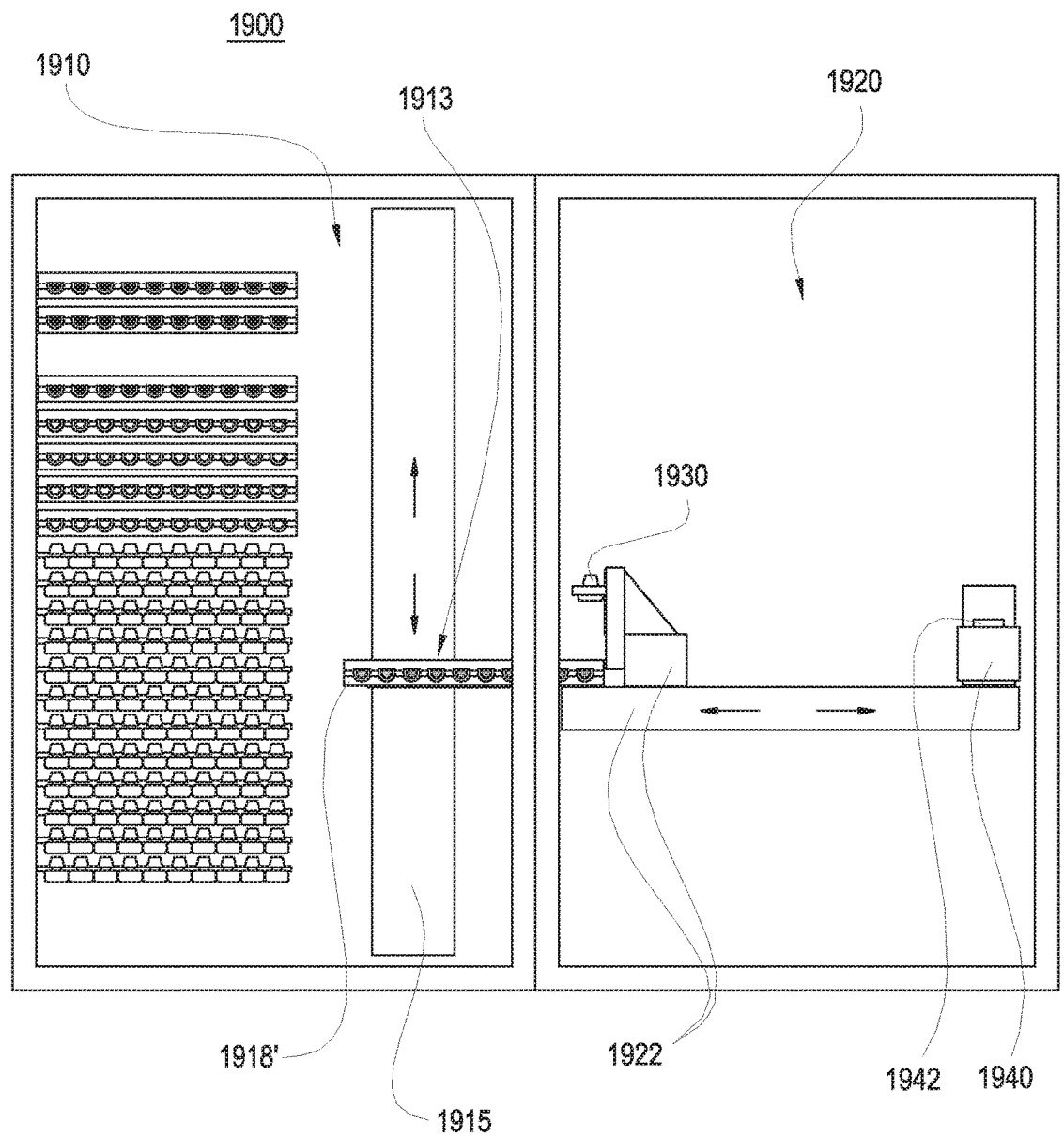

Referring now specifically to FIG. 13*e*, the tray 1913 has move the housing carrier 1918' into a position such that a housing carried by the housing carrier 1918' may be accessible by the computer-controlled manipulation device 1922. Specifically, the tray 1913 has been moved along the vertical axis 1915 such that the housing carrier 1918' is positioned generally above and adjacent to a horizontal axis 1924 of the computer-controlled manipulation device 1922. Additionally, the computer-controlled manipulation device 1922 has been positioned so as to position the light module 1930 generally above the housing carrier 1918'. The positioning of the light module 1930 above a housing carried by the housing carrier 1918' may be similar to that of the positioning of the light module 1520 above the housing 1530 illustrated in FIG. 8*b*, with the exception of the housing carrier 1918' being omitted from FIG. 8*b*. Furthermore, the computer-controlled manipulation device 1922 may be operable to cause the light module 1930 to couple with a housing of the housing carrier 1918' and be removed therefrom, as is consistent with the method of assembly illustrated in FIGS. 8*a-d*.

It is contemplated and included within the scope of the invention that the tray 1913 may be operated so as to return the housing carrier 1918' to the location within the parts repository 1910 from which it was retrieved. Furthermore, it is contemplated and intended to be included within the scope of the invention that the retrieval of a housing from the housing carrier 1918' may be documented in a parts repository inventory, as may be maintained to monitor the quantities of the various parts stored in the parts repository 1910. Such an inventory may be maintained by the controller device 140 as described hereinabove.

Additionally, the parts repository inventory may be maintained such that, after a final housing has been retrieved from the housing carrier 1918', the parts repository inventory may identify the housing carrier 1918' as having no more housings, and hence should not be retrieved by the parts retrieval system 1912. In such a case, an indication can be provided to a user that the housings are no longer in stock and, as such, a luminaire cannot be assembled using the device. Further, the present invention contemplates that an alert providing indication may be generated. In some embodiments, the alert may be transmitted across a network to a stocking facility so that the inventory of housings may be replenished. A similar determination of use of a final optic or light module of an associated carrier may be made, and a similar alert may be generated and/or transmitted.

In some embodiments, the controller device 140 may be configured to access a parts database including information related to a quantity of each type of luminaire housing, each type of optic, and light modules. The database may be located on memory associated with the controller device 140, or may be remote from controller device 140 and accessible across a network. Upon the assembly of a luminaire, the controller device 140 may be configured to record a deduction of a light module, a luminaire housing, and an optic to the parts database, those parts being used in the assembly of the luminaire. Additionally, at least one of the parts database and the controller device 140 may be configured to determine if any of the quantities of each type of luminaire housing, each type of optic, and each type of light modules is equal to or less than a threshold quantity associated therewith. The threshold quantity may be pre-set and alterable by an administrator of the parts database and/or the autonomous assembling and vending system associated with the controller device 140. Upon a determination that the quantity is equal to or less than the threshold quantity, at least one of the controller device 140 and the parts database may generate an alert indicating the determination, similar to the alert described hereinabove.

The procedure illustrated in FIGS. 13*a-e* may similarly be performed so as to access any of the plurality of carriers of light modules 1914 or plurality of carriers of optics 1916 for use in assembly of a luminaire. Accordingly, such accessing procedures are contemplated and included within the scope of the invention.

Additionally, in FIGS. 13*a-e*, there is depicted a programming station 1940. The programming station 1940 may include a coupling section 1942. The coupling section 1942 may be configured to electronically couple to an assembled luminaire, positioning the programming station 1940 with the controller 140 as described hereinabove. Additionally, the programming station 1940 may be configured to send instructions to the controller 140 so as to cause the controller 140 to operate an assembled luminaire to emit light having selected characteristics, as described hereinabove. In some embodiments, the programming station may be configured to establish wireless communication with an assembled luminaire so as to enable such programming of the controller 140 by any means or method known in the art, including, but not limited to, radio communication, such as WiFi, Bluetooth, and Zigbee protocols, visible light communication, and acoustic communication. These methods of wireless communication are exemplary only and non-limiting.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

What is claimed is:

1. A method for assembling a luminaire within an autonomous luminaire assembly and vending system comprising the steps of:
    receiving luminaire specifications defined as received specifications;
    removably coupling a light module with a computer-controlled manipulation device;
    programming the light module to emit light having characteristics responsive to the received specifications;
    retrieving a luminaire housing from a plurality of luminaire housing types responsive to the received specifications;
    attaching the light module to the luminaire housing by operation of the computer-controlled manipulation device;
    retrieving an optic from a plurality of optic types responsive to the received specifications;
    attaching the luminaire housing to the optic by operation of the computer-controlled manipulation device; and
    decoupling the light module and the computer-controlled manipulation device.

2. The method according to claim 1 wherein the step of attaching the light module to the luminaire housing comprises operating the computer-controlled manipulation device to position the light module so as to engage the luminaire housing.

3. The method according to claim 2 wherein the step of attaching the light module to the luminaire housing further comprises inserting the light module into lock tabs associated with the luminaire housing.

4. The method according to claim 1 wherein the step of attaching the luminaire housing to the optic comprises operating the computer-controlled manipulation device to position the luminaire housing so as to engage with the optic.

5. The method according to claim 4 wherein the step of attaching the luminaire housing to the optic further comprises inserting the luminaire housing into lock tabs associated with the optic.

6. The method according to claim 1 wherein the step of retrieving a luminaire housing from a plurality of luminaire housing types comprises:
- accessing a carrier of luminaire housings from a luminaire housing repository comprising a plurality of carriers;
- removing a luminaire housing from the carrier of luminaire housings; and
- replacing the carrier of luminaire housings in the luminaire housing repository.

7. The method according to claim 6 wherein the step of removing a luminaire housing from the carrier of luminaire housings is performed by attaching the light module to the luminaire housing.

8. The method according to claim 1 wherein the step of retrieving an optic from a plurality of optic types comprises:
- accessing a carrier of optics from an optic repository comprising a plurality of carriers;
- removing an optic from the carrier of optics; and
- replacing the carrier of optics in the optic repository.

9. The method according to claim 8 wherein the step of removing an optic from the carrier of optics is performed by attaching the luminaire housing to the optic.

10. The method according to claim 1 wherein the light module is programmed using at least one of radio communication, visible light communication, and acoustic communication.

11. The method according to claim 1 further comprising performing lighting validation to confirm that at least one lighting characteristic of brightness, color, color temperature, color rendering index (CRI), and light distribution of the luminaire complies with the received specifications.

12. The method according to claim 11 wherein if the lighting validation indicates that if at least one of brightness, color, color temperature, CRI, and light distribution of the luminaire does not comply with the received specifications, the method further comprises the step of applying a correction factor to the light module such that a non-conforming lighting characteristic is corrected to comply with the received specifications.

13. The method according to claim 1 further comprising the steps of:
- accessing a parts database including information related to a quantity of each type of luminaire housing, each type of optic, and light modules;
- recording a deduction of the light module, the luminaire housing, and the optic to the parts database;
- determining if any of the quantities of each type of luminaire housing, each type of optic, and light modules is equal to or less than a threshold quantity associated therewith; and
- upon a determination that the quantity is equal to or less than the threshold quantity, generating an alert indicating the determination.

14. The method according to claim 13 wherein the step of generating the alert comprises transmitting a message across a network.

15. The method according to claim 1 wherein the step of coupling the light module to the computer-controlled manipulation device comprises:
- accessing a carrier of light modules from a light module repository comprising a plurality of carriers;
- removing a light module from the carrier of light modules; and
- replacing the carrier of light modules in the light module repository.

16. The method according to claim 15 wherein removing the light module from the carrier of light modules is performed by removably coupling the light module from the computer-controlled manipulation device.

17. The method according to claim 1 wherein the step of removably coupling the light module to the computer-controlled manipulation device comprises gripping the light module with a gripping mechanism of the computer-controlled manipulation device.

\* \* \* \* \*